US011575620B2

(12) United States Patent
Louzoun et al.

(10) Patent No.: US 11,575,620 B2
(45) Date of Patent: Feb. 7, 2023

(54) QUEUE-TO-PORT ALLOCATION

(71) Applicant: Intel Corporation, Santa Clara, CA (US)

(72) Inventors: Eliel Louzoun, Jerusalem (IL); Anjali Singhai Jain, Portland, OR (US); Ben-Zion Friedman, Jerusalem (IL)

(73) Assignee: Intel Corporation, Santa Clara, CA (US)

( * ) Notice: Subject to any disclaimer, the term of this patent is extended or adjusted under 35 U.S.C. 154(b) by 94 days.

(21) Appl. No.: 16/833,401

(22) Filed: Mar. 27, 2020

(65) Prior Publication Data

US 2020/0228467 A1   Jul. 16, 2020

Related U.S. Application Data

(60) Provisional application No. 62/826,165, filed on Mar. 29, 2019.

(51) Int. Cl.
G06F 9/455 (2018.01)
G06F 11/34 (2006.01)
(Continued)

(52) U.S. Cl.
CPC .......... H04L 49/90 (2013.01); H04L 49/3027 (2013.01)

(58) Field of Classification Search
CPC ....... H04L 49/90; H04L 49/30; H04L 49/254; H04L 49/3027; H04L 69/22; H04L 47/11;
(Continued)

(56) References Cited

U.S. PATENT DOCUMENTS

2012/0096192 A1* 4/2012 Tanaka ................. G06F 13/385
710/20
2012/0166690 A1* 6/2012 Regula ................. G06F 13/404
710/104
(Continued)

FOREIGN PATENT DOCUMENTS

WO    2016101587 A1    6/2016

OTHER PUBLICATIONS

Duffy, Jim, "Emerging IEEE Ethernet standards could soothe data center headaches", COMPUTERWORLD, https://www.computerworld.com/article/2522843/emerging-ieee-ethernet-standards-could-soothe-data-center-headaches.html, Jan. 18, 2010, 6 pages.
(Continued)

Primary Examiner — Edan Orgad
Assistant Examiner — Vanneilian Lalchinthang
(74) Attorney, Agent, or Firm — Compass IP Law PC

(57) ABSTRACT

Examples described herein relate to an apparatus including at least one memory and at least one processor communicatively coupled to the at least one memory, the at least one processor to: allocate a scheduler to an egress port and based on unavailability of an egress port, allocate the scheduler to a second egress port to cause any packet allocated to a transmit queue associated with the scheduler to be transmitted using the second egress port. In some examples, a system receives a packet at a port on a network interface, associates a port group with the packet, determines a receive queue for the packet, and copies the packet to the determined receive queue. The port group can be adjusted to remove the port or to add a second port.

18 Claims, 13 Drawing Sheets

(51) Int. Cl.
    *H04L 12/841*     (2013.01)
    *H04L 12/933*     (2013.01)
    *H04L 49/90*     (2022.01)
    *H04L 49/00*     (2022.01)

(58) Field of Classification Search
    CPC . H04L 49/505; H04L 49/3009; H04L 47/122; H04L 43/0894; H04L 45/245; G06F 9/45558; G06F 11/0793; G06F 2201/815
    USPC .......................................................... 370/412
    See application file for complete search history.

(56) References Cited

U.S. PATENT DOCUMENTS

| | | | |
|---|---|---|---|
| 2014/0297889 A1* | 10/2014 | Dong | H04L 61/103 709/245 |
| 2015/0120966 A1 | 4/2015 | Louzoun et al. | |
| 2015/0149661 A1* | 5/2015 | Kanigicherla | G06F 13/10 710/62 |
| 2016/0050150 A1* | 2/2016 | Venkatesan | H04L 49/506 370/236 |
| 2016/0283425 A1* | 9/2016 | Sarangdhar | G06F 13/362 |
| 2016/0342437 A1* | 11/2016 | Khemani | G06F 9/45558 |
| 2017/0242720 A1* | 8/2017 | Anand | G06F 3/0619 |
| 2017/0324616 A1* | 11/2017 | Johnsen | H04L 43/08 |
| 2020/0014637 A1* | 1/2020 | Sindhu | H04L 49/356 |
| 2020/0314014 A1* | 10/2020 | Calciu | H04L 49/254 |

OTHER PUBLICATIONS

Frazier, Howard, et. al., "IEEE 802.3ad Link Aggregation (LAG) what it is, and what it is not". IEEE802.3 HSSG, Apr. 17, 2007, 13 pages.

* cited by examiner

QUEUE-TO-PORT ALLOCATION

RELATED APPLICATION

The present application claims the benefit of a priority date of U.S. provisional patent application Ser. No. 62/826,165, filed Mar. 29, 2019, the entire disclosure of which is incorporated herein by reference.

An input/output (I/O) device such as a network interface card (NIC) may couple to a computing platform or host device deployed in server-network edge where the server domain ends and an external network domain begins. A solution to implement switch logic or circuitry at a NIC in these types of environments is through use of a set of lookup tables. The lookup tables may identify a portion of data such as a packet header and then actions may be defined in the lookup table based on the packet header. One or more lookup tables can be assigned for use per port.

DETAILED DESCRIPTION

Figure 1:
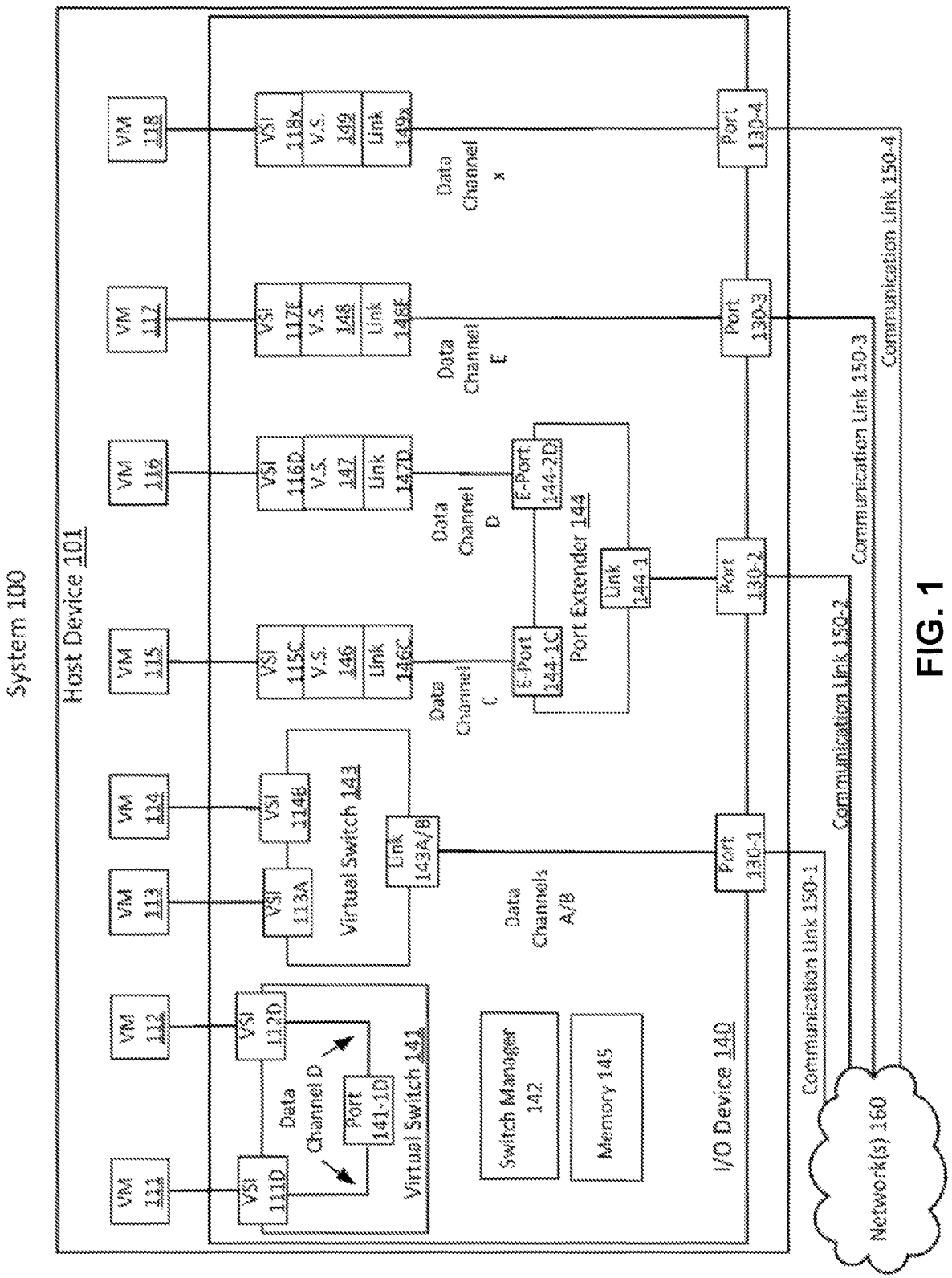
FIG. 1 illustrates an example system.

Link aggregation can include combining or aggregating multiple network connections in parallel. A link aggregation group (LAG) can combine a several physical ports together to make a single data path to provide traffic load sharing among the member ports of the group. See, for example, Link Aggregation Control Protocol (LACP) in IEEE 802.3ad and IEEE 802.1AX-2008. For virtual machines (VMs), implementation of link aggregation can involve a virtual function (VF) being used per port and a teaming driver on top of these VFs in each VM. However, changes in each VM may be needed to support link aggregation, and each VM is to be configured with the underlying network architecture. On the transmit side, in order to avoid the need to expose a VF per port to VMs, a network interface-based implementation for link aggregation may be used. However, in a network interface-based (or hardware-based) solution for link aggregation, a packet could be direct memory access (DMA) copied into the network interface, the network interface calculating a hash and, based on the hash, selecting a port to send the packet. If the selected port was temporarily congested, the network interface will provide deep buffers to hold the packet until the port becomes uncongested.

When implementing single root input/output virtualization (SR-IOV) or Intel® Scalable I/O Virtualization (S-IOV) based virtualization of networking devices, various embodiments separate link aggregation from being performed by a VM, so that a single virtual function (VF) can be used for packet-port assignments, no matter which link is used. Various embodiments manage physical port selection in a way that does not affect the tenant owned VM or involve a VM managing physical port selection. Various embodiments provide for software (e.g., OS or VM) selecting a transmit queue. Various embodiments provide a transmit queue-to-scheduler mapping and scheduler to port mapping, and a scheduler allows or causes packet copying (e.g., direct memory access (DMA)) to the network interface if a mapped port has credits and is not congested. In some cases, for transmit operations, a network interface need not provide larger buffers for storing packets in the event of port congestion or perform load distribution among ports, although the network interface can include any of such features.

In various embodiments, one or more of the following features are provided: forwarding of traffic from multiple ports using a single forwarding table; scheduling of traffic from the host to multiple ports using a load balancing by tying a transmit queue to a scheduler and tying a scheduler to a port; ability to fail over traffic from one port to another when a port fails by migrating a transmit queue to another scheduler or a scheduler to another port; and ability to send control packets to a specific port such as alive packets of Link Aggregation Control Protocol (LACP) packets.

In various embodiments, a transmit queue can reference data traffic that is sent from any port without the VM being involved in such queue-to-port association. To load balance traffic among transmit ports, a PF driver can reallocate a transmit queue from using one port to another port by associating the transmit queue with another transmit scheduler. If control packets are to be transmitted from a particular port, control packets can be assigned to a transmit queue that is tied to using the particular port. Various embodiments provide load balancing based on host load balancing methods such as load balancing or reallocation of transmit queue-to-scheduler or scheduler-to-node.

Various embodiments provide coordination between the physical function (PF) drivers of different ports so that a single PF driver remains active and can control scheduling of transmission from the ports whereas the other PF/PFs becomes dormant. Some embodiments provide for a single PF to manage packet transmission scheduling for ports of the network interface. A network interface LAG can be either setup dynamically with software coordination and triggered by software tools or a static bond of a LAG can be used.

Description turns to example manners of allocating receive queues for received packets. FIG. 1 illustrates an example system. System 100 may include a host device 101 coupled to input/output (I/O) device 140. System 100 can be used at least to receive data from network 160 using I/O device 140. I/O device 140 can include capability of one or more of: a network interface controller, network interface card, smart network interface, fabric interface, interface to an interconnect or bus, and so forth. In some examples, I/O device 140 includes a switch manager 142. As described in more detail later, switch manager 142 can assign a switch identification (SwitchID or switchID) or port group identifier to data received at I/O device 140. For these examples, the data may be received at a port (e.g., port 130-1 to port 130-4) from among various ports depicted in FIG. 1. The assigned switch identifications may then be used as part of a lookup table to determine one or more actions for processing the data at I/O device 140 (e.g., receive queue assignment, forwarding, cryptographic/security processing, etc.).

I/O device 140 may be coupled to host device 101 through various virtual station interfaces (VSIs) 111D, 112D, 113A, 114B, 115C, 116D, 117E and 118*x* ('x' indicates association with a yet to be established data channel) included in virtual switches (V.S.) 141, 143, 146, 147, 148, and 149. The various VSIs included with these virtual switches may be separately arranged to couple to virtual machines (VMs) 111-118 as shown in FIG. 1 and may enable data (e.g., in the form of data packets or data frames) to be received from or sent/transmitted to VMs 111-118. A VSI can include or refer to a port in a virtual switch. A VSI can refer to or include a VF or an emulated interface used by a virtual machine manager (VMM).

For these examples, VMs 111-118 may be configured or arranged to be implemented using computing resources maintained at host device 101. Any number of virtual switches may be associated with any number of VSIs to communicatively couple to any number of VMs and/or virtual machine managers (hypervisors). Note that reference to a VM can refer to any virtualized execution environment. A virtualized execution environment can include at least a virtual machine, process containers, machine containers, or application processes. A virtual machine (VM) can be software that runs an operating system and one or more applications. A VM can be defined by specification, configuration files, virtual disk file, non-volatile random access memory (NVRAM) setting file, and the log file and is backed by the physical resources of a host computing platform. A VM can be an OS or application environment that is installed on software, which imitates dedicated hardware. The end user has the same experience on a virtual machine as they would have on dedicated hardware. Specialized software, called a hypervisor, emulates the PC client or server's CPU, memory, hard disk, network and other hardware resources completely, enabling virtual machines to share the resources. The hypervisor can emulate multiple virtual hardware platforms that are isolated from each other, allowing virtual machines to run Linux® and Windows® Server operating systems on the same underlying physical host.

A container can be a software package of applications, configurations and dependencies so the applications run reliably on one computing environment to another. Containers can share an operating system installed on the server platform and run as isolated processes. A container can be a software package that contains everything the software needs to run such as system tools, libraries, and settings. Containers are not installed like traditional software programs, which allows them to be isolated from the other software and the operating system itself. Isolation can include access of memory by a particular container but not another container. The isolated nature of containers provides several benefits. First, the software in a container will run the same in different environments. For example, a container that includes PHP and MySQL can run identically on both a Linux computer and a Windows machine. Second, containers provide added security since the software will not affect the host operating system. While an installed application may alter system settings and modify resources, such as the Windows registry, a container can only modify settings within the container.

According to some examples, as shown in FIG. 1, a logical port (L-port) 141-D is shown as included in virtual switch 141. L-port 141-D may serve as a logical port capable of being coupled to a data channel D. As mentioned more below, data channel D may be arranged to route data between VM 111 and VM 112. The routing of the data, for example, may be through respective VSIs 111 and 112.

Communication links 150-1 to 150-4 may couple network elements included in network(s) 160 to host device 101 via respective ports 130-1 to 130-4. In some examples, ports 130-1 to 130-4 may represent a physical connector or port via which data (e.g., in the form of data packets or frames) may be received at or sent/transmitted from I/O device 140. I/O device 140 is also shown as including a port extender 144. According to some examples, as shown in FIG. 1, port extender 144 may include E-port 144-1C and E-port 144-2D. For these examples, port extender 144 may enable physical port 103-2 to be extended to at least two extender/logical ports to route data to/from virtual switches 146 and 147 via E-port 144-1C and E-port 144-2D.

According to some examples, I/O device 140 may be configured to operate in accordance with or implement at least some aspects of a proposed IEEE standard (including progenies and variants) having the title of IEEE Standard for Local and metropolitan area networks: Virtual Bridged Local Area Networks: Bridge Port Extension", IEEE Std 802.1BR-2012, July 2012 (hereinafter "IEEE 802.1BR"). For these examples, I/O device 140 may also be configured to operate in compliance with or implement at least some aspects of IEEE 802.1Qbg-2012 (including progenies and variants). As part of the implementation of IEEE 802.1Qbg or IEEE 802.1BR, various data channels may be established for routing data either locally between virtual machines on host device 101 or globally to network elements located at network(s) 160.

In some examples, various established data channels are identified as data channels A-E. For these examples, the various VSIs coupled to VMs 111 to 116 are associated with data channels A, B, C, D or E with the exception of VSI 118*x* coupled to virtual machine 118. VSI 118*x*, in some examples, may represent a VSI yet to be associated with an established data channel. As mentioned more below, data routed through VSI 118*x* may include control information used to eventually establish a data channel with VSI 118*x* or administer a data channel. For these instances, a default identification or tag for this control data may be locally generated or originated at I/O device 140 and then used to assign a switch identification to the data.

According to some examples, data channels may be used to either route data between VMs located at host device 101 or to route data to between VMs and network elements located at network(s) 160. For these example, identification information for the data routed via these data channels may include a tag described in IEEE 802.1Qbg or IEEE 802.1BR. The tag may be a Service tag (S-tag) or a Bridge Port Extension tag (E-tag). In some examples, the S-tag or E-tag may be identification information to indicate that data having one of these tags may be associated with a given channel. These tags may be globally generated or originated from elements remote to I/O device 140 such as network elements at network(s) 160.

In some examples, switch manager 142 may include logic and/or features arranged to receive data at I/O device 140. The data may be associated with a VSI and may have identification information (e.g., an S-tag or E-tag) to indicate an association with channel A. As shown in FIG. 1, a VSI coupled to or associated with channel A may be VSI 113A. For these examples, VSI 113A may be arranged or configurable to couple to VM 113 and also arranged to route data from VM 113 through virtual switch 143. According to some examples, since the data is routed via a data channel coupled to network(s) 160, the data may be considered as being received at the physical port 130-1 coupled to channel A.

Switch manager 142 may include logic and/or features arranged or configured to assign a switch identification number to the data based on the identifier assigned to port 130-1, identification information for the data (e.g., tag information), and the originator of at least a portion of the identification information. The switch identification information may then be used by logic and/or features of switch manager 142 as part of a lookup table to determine one or more actions for processing the data at I/O device 140.

In some other examples, data having identification information to indicate an association to channel A may be received at I/O device 140 via port 130-1. The data received through port 130-1 may then be routed via channel A to virtual switch 143. As mentioned previously, VSI 113A may couple to VM 113. For these examples, VSI 113A may be arranged to cause the data to be sent or transmitted to VM 113. For these other examples, switch manager 142 may include logic and/or features arranged or configured to assign a switch identification number to the data based on an identifier assigned to the I/O device 140 receiving port (port 130-1), identification information for the data, and the originator of at least a portion of the identification information. The switch identification information may then be used by logic and/or features of switch manager 142 as part of a lookup table to determine one or more actions for processing the data at I/O device 140.

In some examples, data may be received at a port included in I/O device 140 that may be routed between VMs 111 and 112 via data channel D at virtual switch 141. Data received at L-port 141-1D through VSI 111D from VM 111 may have a destination of VM 112. For these examples, identification information for the data received at port 141-1D may include a data channel identification number originated at I/O device 140 (e.g., at virtual switch 141). The data channel D identification number may be similar to the format of an S-tag or E-tag. Switch manager 142 may include logic and/or features arranged or configured to assign a switch identification number to the data based on an identifier assigned to the port 141-1D, the locally generated channel D identification number, and an indication that the originator of at least a portion of the identification information was at I/O device 140. The switch identification information may then be used by logic and/or features of switch manager 142 as part of a lookup table to determine one or more actions for processing the data at the I/O device 140. In some examples, a single lookup table can be used for a receive port to switchID (port group) association and another table can be used for switchID to receive queue association.

In some examples, virtual switch 141 may be configured to operate in accordance with IEEE 802.1Qbg and function as a Virtual Ethernet Bridge (VEB).

In some examples, communication links 150-1 to 150-4 may communicatively couple I/O device 140 to network(s) 160 via ports 130-1 to 130-4, respectively. Communication links 150-1 to 150-4 may include various types of wired, wireless or optical communication mediums. For these examples, communication links 150-1 to 150-4 may be operated in accordance with one or more applicable communication or networking standards in any version. The communication or networking standards may include, but are not limited to, IEEE 802.1Qbg or IEEE 802.1BR.

Figure 2A:
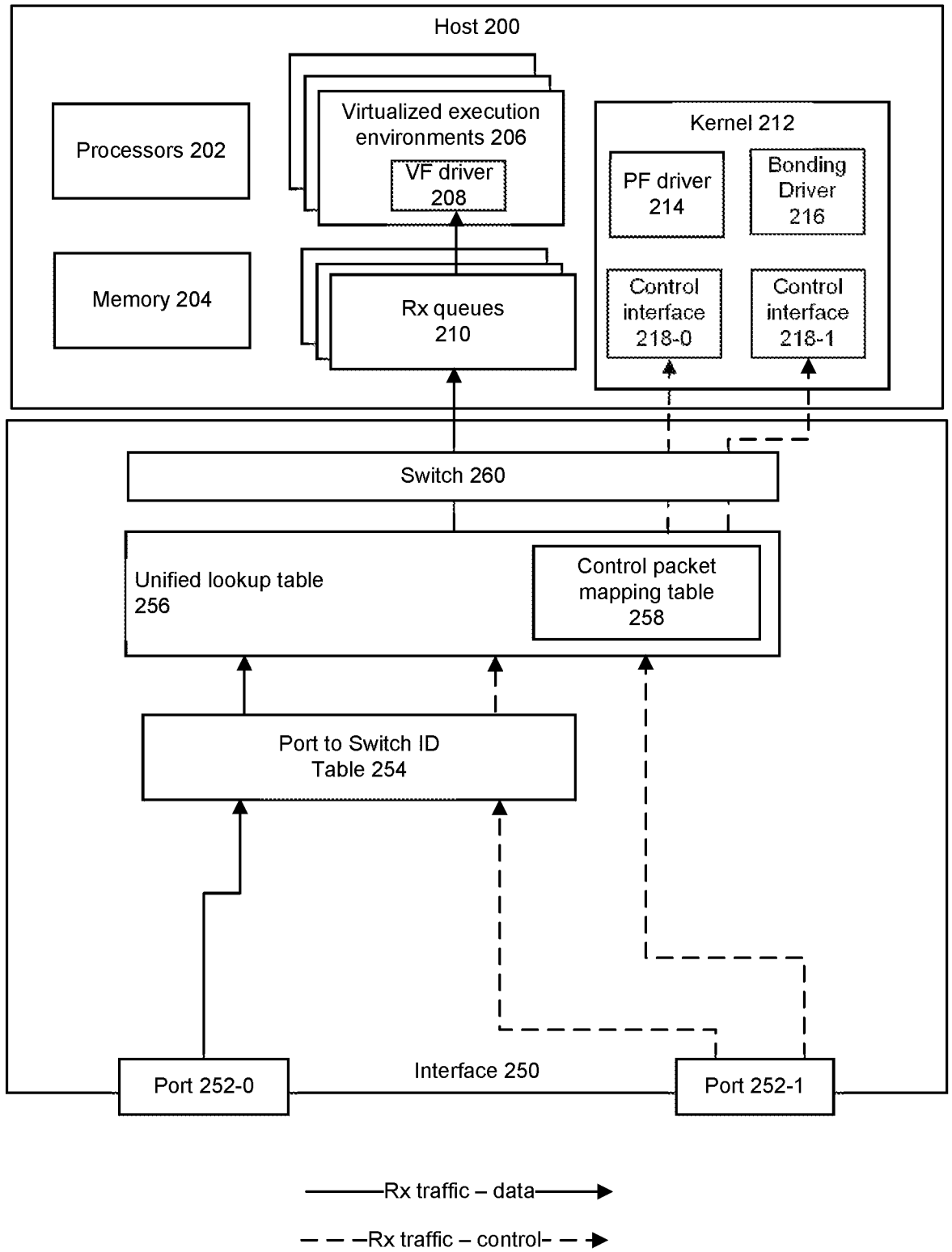
FIG. 2A depicts an example system for processing received packets.

FIG. 2A depicts an example system for processing received packets. Network interface 250 includes one or more ports (e.g., ports 252-0 to 252-1) that can be used to process receive packets from a network medium (e.g., network 160), fabric medium or other wired or wireless medium. Other numbers of ports can be supported. According to some embodiments, a table 254 can be used for multiple physical ports to associate a switchID, LAG, or port group of a packet with port. Table 254 can be a single copy accessible to interface 250 for all ports instead of every port having its own lookup table to identify a switchID, LAG or port group of a received packet. However, in some examples, any port (or group of ports) can have any associated table to identify a switchID, LAG or port group of a received packet.

In some examples, a Switch ID represents a port group number of a port group. Table 254 can be used to merge multiple network ports to a single switching context to allow for usage of a single table for forwarding decisions from multiple ports. Using a single routing table, table 254 can use a mapping of one or more ports to a Switch ID. For example, Switch ID allocation and lookup described in U.S. Pat. No. 9,280,367 can be used to associate a port with a port group. U.S. Pat. No. 9,280,367 is incorporated by reference in its entirety. In some examples, table 254 can be used to associate one or more ports with a Switch ID. For example, packets received on port 252-0 can be assigned a Switch ID=0 whereas packets received on port 252-1 can be assigned a Switch ID=1.

For example, table 254 can be associated with 1, 2, 4, 8 or more ports. In this example, one or more ports can be associated with a SwitchID or port group number.

| Port | SwitchID |
|------|----------|
| 0    | 0        |
| 1    | 1        |
| 2    | 1        |
| 3    | 0        |
| 4    | 3        |
| ...  | ...      |
| 7    | 4        |

In this example, ports 0 and 3 are associated with SwitchID of 0; ports 1 and 2 are associated with SwitchID of 1; port 4 is associated with SwitchID of 3; and port 7 is associated with SwitchID of 4.

For example, an administrator can tie one or more ports to a Switch ID using a PF driver 214. PF driver 214 can allocate physical ports to a Switch ID and cause an update of table 254. Tying or association of one or more ports to a Switch ID can occur to provide traffic load balancing among ports or receive (Rx) queues (e.g., hashing across all receive queues to evenly balance received traffic across receive (Rx) queues). PF driver 214 can program the switch tables partially or in totality and can program rules to direct packet traffic to an Rx queue. PF driver 214 can expose (e.g., permitting configuration or use of) a network interface to an OS or a VM.

For received data plane and control plane packets, table 254 can be used to identify a port group identifier (e.g., Switch ID or switch identification) for a packet based on a port through which the packet was received. A data plane, which is also referred to as forwarding plane or user plane, carries data packet traffic such as application data. In a network element (e.g., a hardware switch or a hardware router), the data plane is the part of the architecture that decides what actions to perform on received packets at an ingress interface. A control plane and control plane packets control signaling traffic and routing of a network element. Control plane traffic can include flow control traffic, rate limiting requests, alive packets of Link Aggregation Control Protocol (LACP) packets, and so forth.

Instead of, or in addition to, a received packet's physical port number and packet's media access control (MAC) address being used to identify a receive queue associated with a virtualized execution environment that is to process a received packet, a port group number (e.g., Switch ID) and media access control (MAC) address of the received packet can be used to determine a virtualized execution environment that is to process a received packet. For control plane and data plane packets, unified lookup table 256 can associate a virtualized execution environment with a MAC address and switchID.

For example, a format of table 256 can be as follows.

| SwitchID | Receiver (destination) MAC address | Rx Queue identifier |
|---|---|---|
| 0 | 00:0a:95:9d:68:16 | 0000 |
| ... | ... | ... |
| 7 | 00:00:00:a1:2b:cc | 1111 |

Any number of ports or receive queues can be used.

For received control packets, a received port number can be provided for use of table 258 to differentiate control packets per physical port. Using control packet mapping table 258, a received control plane packet can be identified using special rules (e.g., EtherType=LACP) and forwarded using the receive port of the received control plane packet as part of a lookup rule to a specific receive queue per PF. In some examples, for control plane packets, a received port number is used to associate received traffic with a PF driver. The control packet can be copied using a direct memory access (DMA) engine from interface 250 to a buffer associated with the PF driver. For example, a format of table 258 can be as follows.

| Port number | Rx Queue identifier |
|---|---|
| 0 | 00 |
| ... | ... |
| 7 | 11 |

Any number of ports or receive queues can be used.

In host 200, kernel 212 can be part of a host operating system stored in memory 204 or a cache and executed by one or more of processors 202. PF driver 214 and bonding driver 216 can be invoked or called by kernel 212. In some examples, bonding driver 216 takes multiple physical ports and exposes multiple ports as a single physical port to a networking stack. Control interface 218-0 and control interface 218-1 can include or access a queue to receive control packets routed by control packet mapping table 258 through switch 260.

Rx queue 210 can receive packets routed by table 256 through switch 260. Virtualized execution environments 206 can run an operating system, applications, and VF driver 208. By use of VF driver 208, virtualized execution environments 206 can access content of Rx queue 210.

Processors 202 can be an execution core or computational engine that is capable of executing instructions. A core can have access to its own cache and read only memory (ROM), or multiple cores can share a cache or ROM. Cores can be homogeneous and/or heterogeneous devices. Any type of inter-processor communication techniques can be used, such as but not limited to, messaging, inter-processor interrupts (IPI), inter-processor communications, and so forth. Cores can be connected in any type of manner, such as but not limited to, bus, ring, or mesh. Processors 202 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. Memory 204 can be any volatile or non-volatile memory.

Some embodiments of the system support and use either or both of SR-IOV or S-IOV. A SR-IOV extension enables multiple virtualized execution environments (e.g., system images) to share PCIe hardware resources under a single-node system (e.g., single root complex). SR-IOV is compatible at least with specifications available from Peripheral Component Interconnect Special Interest Group (PCI SIG) including specifications such as Single Root I/O Virtualization and Sharing specification Revision 1.1 (2010) and variations thereof and updates thereto. A SR-IOV device provides a bus device function (BDF) identifier for a virtual function within a PCIe hierarchy; a unique memory address space for a virtual function (VF) within a PCIe hierarchy; a unique error logging and escalation scheme; a unique MSI/MSI-X capability for each VF within a PCIe hierarchy; and power-management capabilities for each VF within a PCIe hierarchy. In addition, SR-IOV provides the capability to discover and configure virtualization capabilities which include a number of VFs that the PCIe device will associate with a device and the type of base address register (BAR) mechanism supported by the VFs.

Figure 2B:
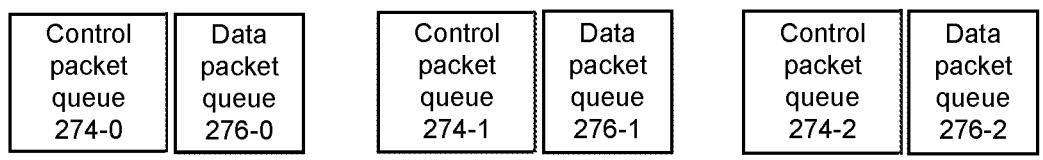
FIGS. 2B and 2C depict an allocation of control and data packet queues.
Figure 2B:
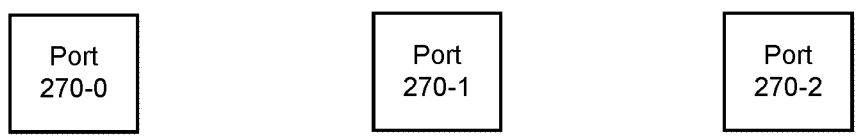

FIG. 2B depicts an allocation of control and data packet queues. In some examples, control packet queues and data packet queues can be allocated for a port. For example, ports 270-0 to 270-2 can receive packets and tables 272 can be used to associate a receive queue with a received packet. For example, techniques described earlier to associate a receive queue with a receive port or port group identifier can be used. A packet descriptor can be completed and stored in a receive queue that indicates a receive port number and characteristics of a packet. In the queues, a descriptor that references a received packet storage location and header fields can be stored. A descriptor can include memory location or index identifying where received packet bytes stored, length of the packet, and so forth. For example, the descriptor can be processed by a driver or operating system to provide access to data in a received packet to an application. In some examples, control packet queue 274-0 and data packet queue 276-0 can be allocated for a port 270-0; control packet queue 274-1 and data packet queue 276-1 can be allocated for a port 270-1; and control packet queue 274-2 and data packet queue 276-2 can be allocated for a port 270-2.

Figure 2C:
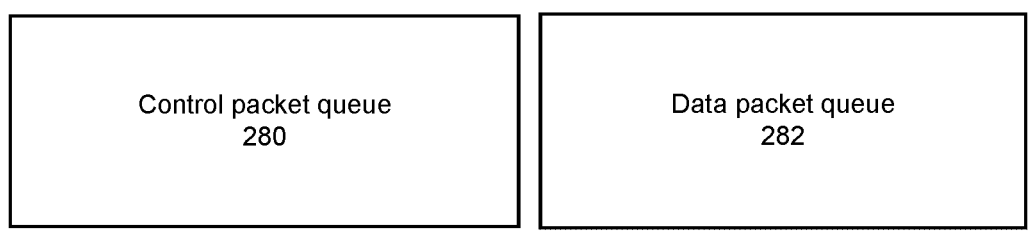
Figure 2C:
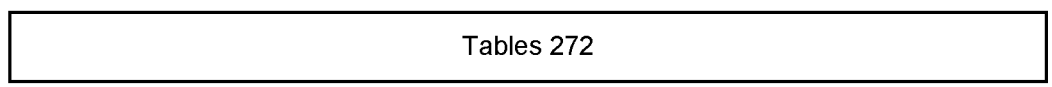
Figure 2C:
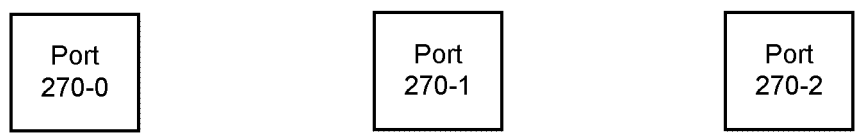

FIG. 2C depicts an example of a control packet queue and data packet queue allocated per group of ports. In some examples, control packet queue 280 and data packet queue 282 can be allocated for descriptors associated with received packets through ports 270-0 to 270-2. Tables 272 can be configured to associate a control or receive queue with a received packet according to embodiments described herein.

Figure 3:
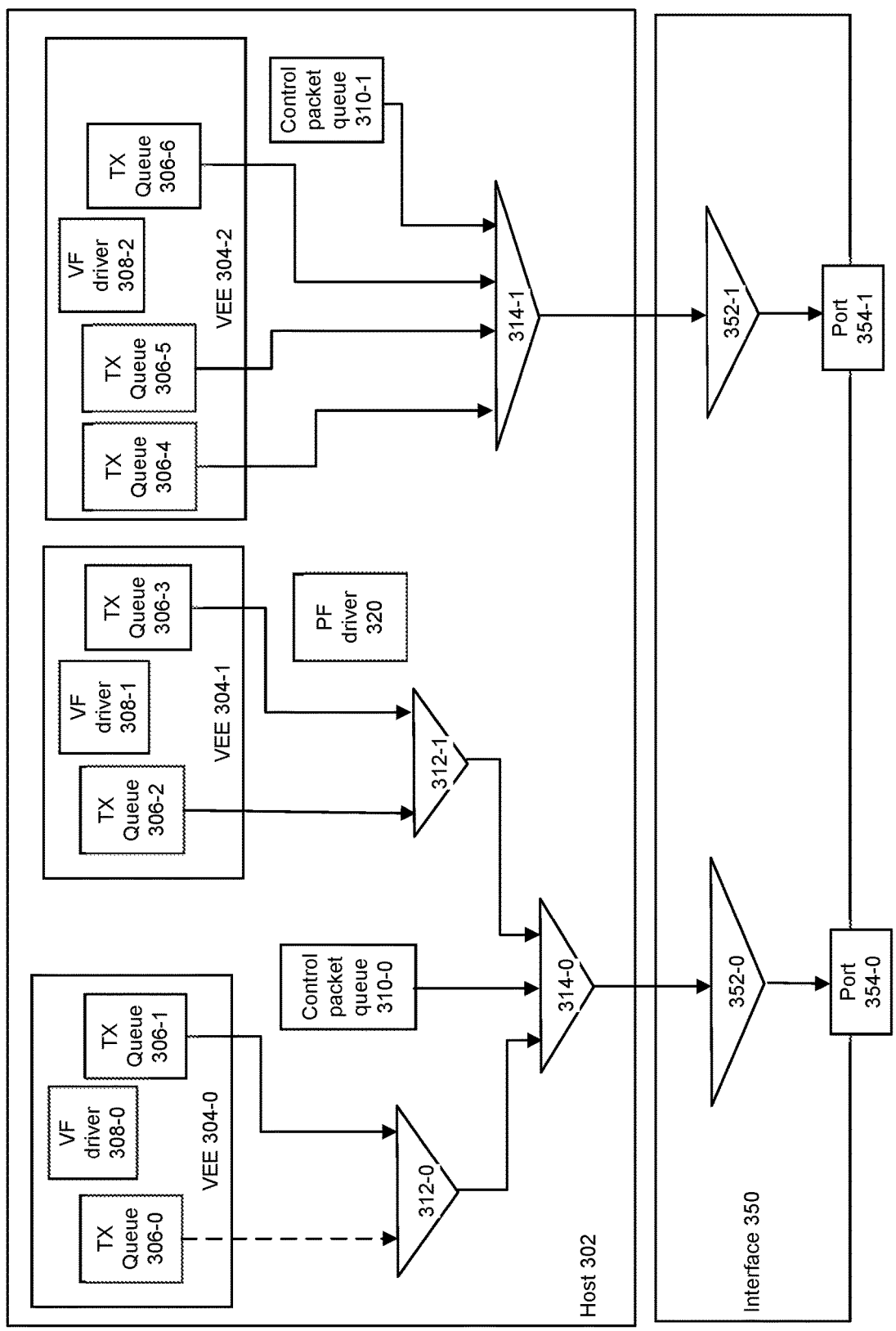
FIG. 3 depicts a simplified block diagram of examples of packet scheduler configurations.

Description next turns to an example manner to select a port for a packet transmission. FIG. 3 depicts a simplified block diagram of examples of packet scheduler configurations. Note that host 302 and interface 350 can use any of the hardware and/or software elements described herein. Virtualized execution environment (VEE 304-0 to 304-2) running an application (not shown) can have content (e.g., data) available for transmission. If VEEs (or CPUs that run the VEEs) have statistically similar network utilization, then distributing the traffic from the different CPUs (or cores) to different ports evenly (e.g., using a hash calculation) can provide load balancing of port usage. As the traffic of a VEE (or CPU) is assigned to a specific Tx queue, the traffic of different queues can be distributed to different ports. According to some embodiments, load balancing or other allocations of packets for transmission through a port can occur by allocation of host schedulers to TX queues and/or host schedulers to particular port schedulers.

In this example, VEEs 304-0 to 304-2 can have associated transmit queues. VF drivers 308-0 to 308-2 can provide for transfer of packet data for transmission from transmit queues of respective VEE 304-0 to 304-2. Host schedulers 312-0, 312-1, 314-0, and 314-1 can select packets for transmission from transmit (TX) queues 306-0 to 306-6 and control packet queues 310-0 to 310-1. In some examples, host schedulers 312-0, 312-1, 314-0, and 314-1 can execute in an operating system (OS) kernel or in user space. Note that a Tx queue and control packet queue can store descriptors that are associated with packets that are to be transmitted. In this particular example configuration, schedulers 312-0 and 312-1 and control packet queue 310-0 provide available packets to scheduler 314-0. Scheduler 312-0 selects available packets from Tx queues 306-0 and 306-1 whereas scheduler 312-1 selects available packets from Tx queues 306-2 and 306-3. Tx queues 306-4 to 306-6 and control packet queue 310-1 provide available packets to scheduler 314-1.

For example, a PF driver 320 can apply an equal weighting scheme (e.g., hash) to select a port for transmission for a packet. Use of a hash can provide for load balancing of use of ports 354-0 or port 354-1. For the sake of illustration, merely two ports are shown, but other numbers of physical ports can be used. A hash calculation can be available in an operating system (OS) or available to a VEE.

PF driver 320 can load balance use of ports 354-0 and 354-1 by associating a tier or arrangement of host schedulers with port schedulers 352-0 and 352-1. According to some embodiments, assignment of a Tx queue to a transmit port can be achieved by one or more PF drivers 320 tying a Tx queue to a host scheduler and tying a host scheduler to a port scheduler associated with a transmit (egress) port. To dissociate port assignment away from VEEs, PF driver 320 can tie one or more Tx queues of a VEE to a host scheduler. A host scheduler node can decide which Tx queue to schedule to a port for transmission based on bandwidth available at a port. The scheduler node can fetch a descriptor from a Tx queue and cause the associated data to be copied to interface 350. Note the concept of queue described here can be either a stateless LAN queue, an RDMA queue set, an NVMe-oF queue, or any other type of traffic queue.

When a port is unavailable (e.g., fails, is congested, or it not to be used), PF driver 320 can redirect some or all the Tx queues associated with the unavailable port to another port node associated with an active port(s). In case of port failure, all host schedulers move to a port scheduler associated with other active port(s). In case of congestion, a part of the host schedulers (and associated Tx queue(s)) can move to a port scheduler node associated with other active port(s). Port failure or unavailability can be detected by a teaming driver in some examples. Port failure can occur for example if alive loopback packets are not received (no response).

PF driver 320 can manage Tx queue to scheduler node association using a table stored in memory. In some examples, a table can identify associations between a host scheduler, transmit queues, port schedulers and port.

| Host Scheduler | Associated Transmit Queues | Port Scheduler | Port |
|---|---|---|---|
| 000 | VEE-0: Tx-0 and Tx-1 | 0000 | 00 |
| 001 | VEE-1: Tx-0 and Tx-1 | 0001 | 01 |
| ... | | ... | ... |
| 111 | VEE-7: Tx-0, Tx-1, and Tx-2 | 0111 | 10 |

In some examples, control plane traffic can be allocated to queues 310-0 and 310-1 designated as control queues. In some examples, transmitted control plane traffic does not fail over to another port as control traffic is port specific. If a port fails, Tx control traffic on that port is stopped. PF driver 320 can tie control packets to an egress port by use of a control packet queue 310-0 and 310-1, which in some examples is not migrated to another port scheduler. But in some embodiments, data plane traffic can be failed, migrated, or moved to another port.

When SR-IOV are used, PF driver 320 can provide connectivity between interface 350 and host 302. A VEE can request PF driver 320 for queue creation. In interface 350, PF driver 320 can program context and queue, size of queue, type of descriptors, location of data to be transmitted in memory.

For example, in this configuration, host schedulers 314-0 and 314-1 can identify prospective packets for transmission (e.g., using descriptors) to respective port schedulers 352-0 and 352-1. Port schedulers 352-0 and 352-1 can schedule packet transmission through respective ports 354-0 and 354-1. In other configurations, multiple host schedulers can be associated with a particular port scheduler.

According to some embodiments, a VEE does not manage or track what port data traffic is sent through. PF driver 320, a firmware/virtual machine manager (VMM) or OS can perform Tx queue migration without the VEE intervening. In some examples, network interface 350 does not provide load balancing of traffic through ports or migration of packets from a congested port to a non-congested port, although network interface 350 can perform such feature. One or more Tx queues associated with a host scheduler node can be associated with another host scheduler node and a host scheduler node can schedule transmission using another port scheduler. To provide load balancing or in the event of port failure or congestion, a host scheduler node can be associated with another port. Accordingly, a queue or scheduler node can be migrated to use another port without a VEE or its application managing the migration or without providing notification of the migration. For migration or movement of a Tx queue to another port, the PF driver 320 updates context to indicate a Tx queue is moved to another host scheduler node or port scheduler node. PF driver 320 can determine which host scheduler node is permitted to use a particular egress port. In some examples, multiple PF drivers are used, where a port has an associated PF driver whereby PF #0 can manage port 354-0 whereas PF driver #1 manage port 354-1.

A queue pause and resume feature can be used when moving a queue or scheduler tree to another port or moving a queue to another scheduler tree. When a Tx queue is moved to another scheduler, PF driver 320 informs a VEE associated with a Tx queue to pause posting to a particular Tx queue while the Tx queue is moved to another scheduler node. After the Tx queue is moved to another scheduler node, PF driver 320 allows the VEE to resume populating the moved Tx queue. In some cases, for a queue migration, network interface 350 performs outstanding requests and quiesces a Tx queue (does not transmit packets received as a movement or migration occurs) until the Tx queue is tied to another port so that a VEE is uninvolved with queue migration.

If interface 350 has flexibility to expose a single PF driver by making some network interface device configuration changes in non-volatile memory (NVM) and there is no need for a dynamic Tx queue aggregation or disaggregation using multiple PF drivers, a single PF driver can access information about the different scheduler trees or nodes associated with each port and the link information for each port (e.g., from firmware). PF driver 320 can migrate Tx queues among scheduler nodes to manage packet transmit load on one or more ports.

Dynamic link aggregation can occur to form association between ports and a port group or modify (e.g., add or remove) ports that are part of a port group. In a case where a dynamic link aggregation is to be used or where interface 350 does not support exposing a single PCIe device or single PF driver across all egress ports, various handoff embodiments can be used. Any PF driver can trigger link aggregation and cause other PF driver(s) to go dormant in terms of exposing (e.g., permitting configuration or use of) a network interface into the OS or a VEE, and the PF driver that triggered link aggregation become the sole or main PF driver. A channel between PF drivers using the kernel or mailboxes in interface 350 to handoff configuration information between PF drivers. The PF driver that acts as the main can configure a single switch for interface 350 and access function information regarding a scheduler tree, link information and so forth of the other PF driver(s) about the port(s) that the other PF driver(s) were connected to. In case of a port becoming unavailable (e.g., congested, failed, and so forth), the main PF driver accesses port information and can reprogram the per Tx queue to scheduler node association with a Tx queues Disable/Enable since the main PF driver controls that mapping. A main PF can configure Tx queues associated with separate scheduler nodes tied to separate ports to be associated with the same scheduler node and the same port. The main PF can also choose to expose control interfaces per port into the OS and direct just certain traffic to the control interfaces using special rules (e.g., EtherType is LACP) and the port-to-interface association.

Note that in some examples, port schedulers are not used and host schedulers are associated directly with ports. In other examples, host schedulers are not used and transmit queue are associated with port schedulers, which are associated directly with ports.

Figure 4A:
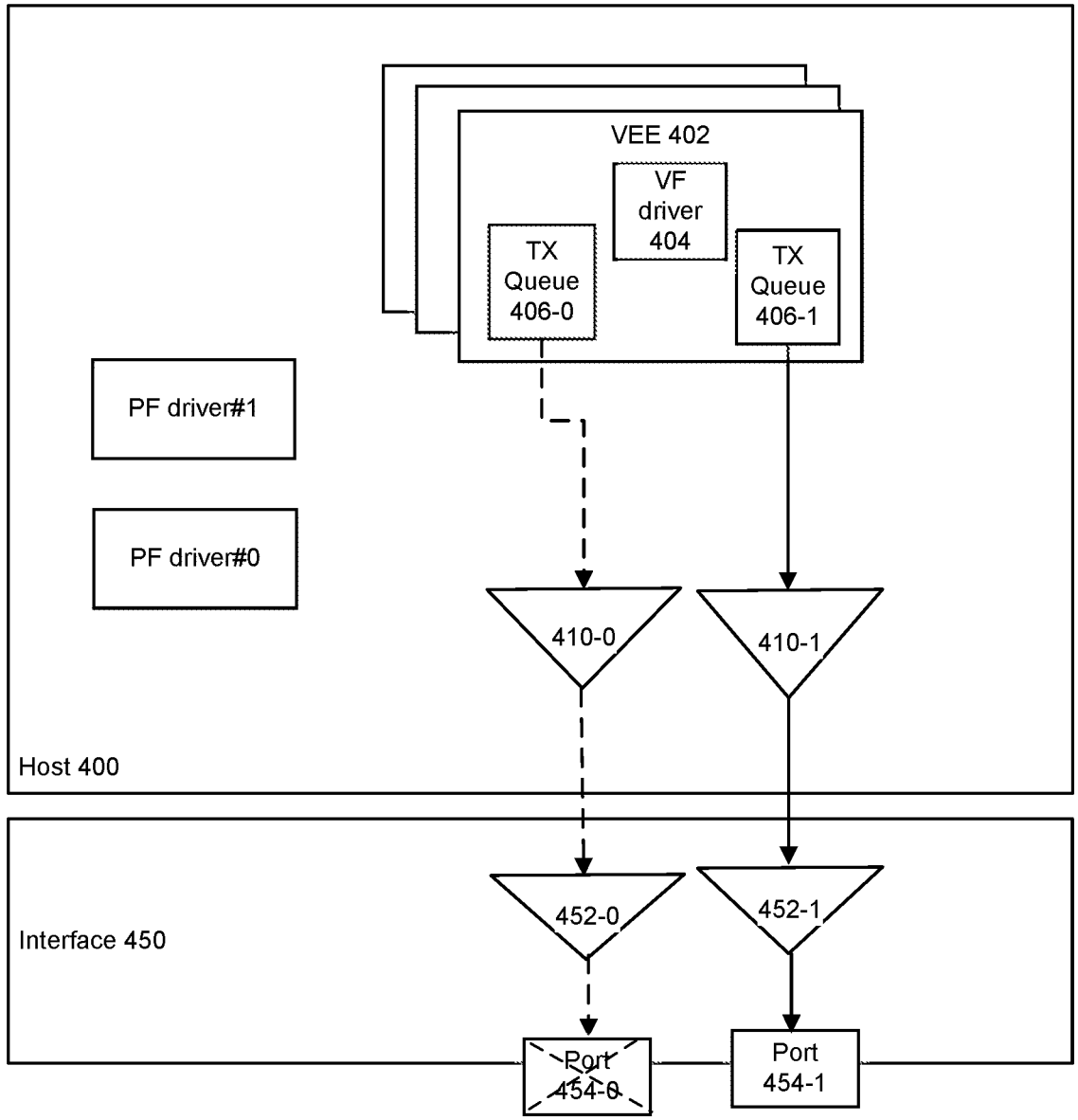
FIG. 4A depicts an example of a transmit queue association.

Next description turns to an example of a transmit queue migration to another host scheduler. FIG. 4A depicts an example where transmit queue 406-0 is associated with host scheduler 410-0 and transmit queue 406-1 is associated with host scheduler 410-1. Host scheduler 410-0 is associated with port scheduler 452-0 whereas host scheduler 410-1 is associated with port scheduler 452-1. Port scheduler 452-0 schedules packet transmission from port 454-0 whereas port scheduler 452-1 schedules packet transmission from port 454-1. In this example sequence, port 454-0 becomes congested or fails.

Figure 4B:
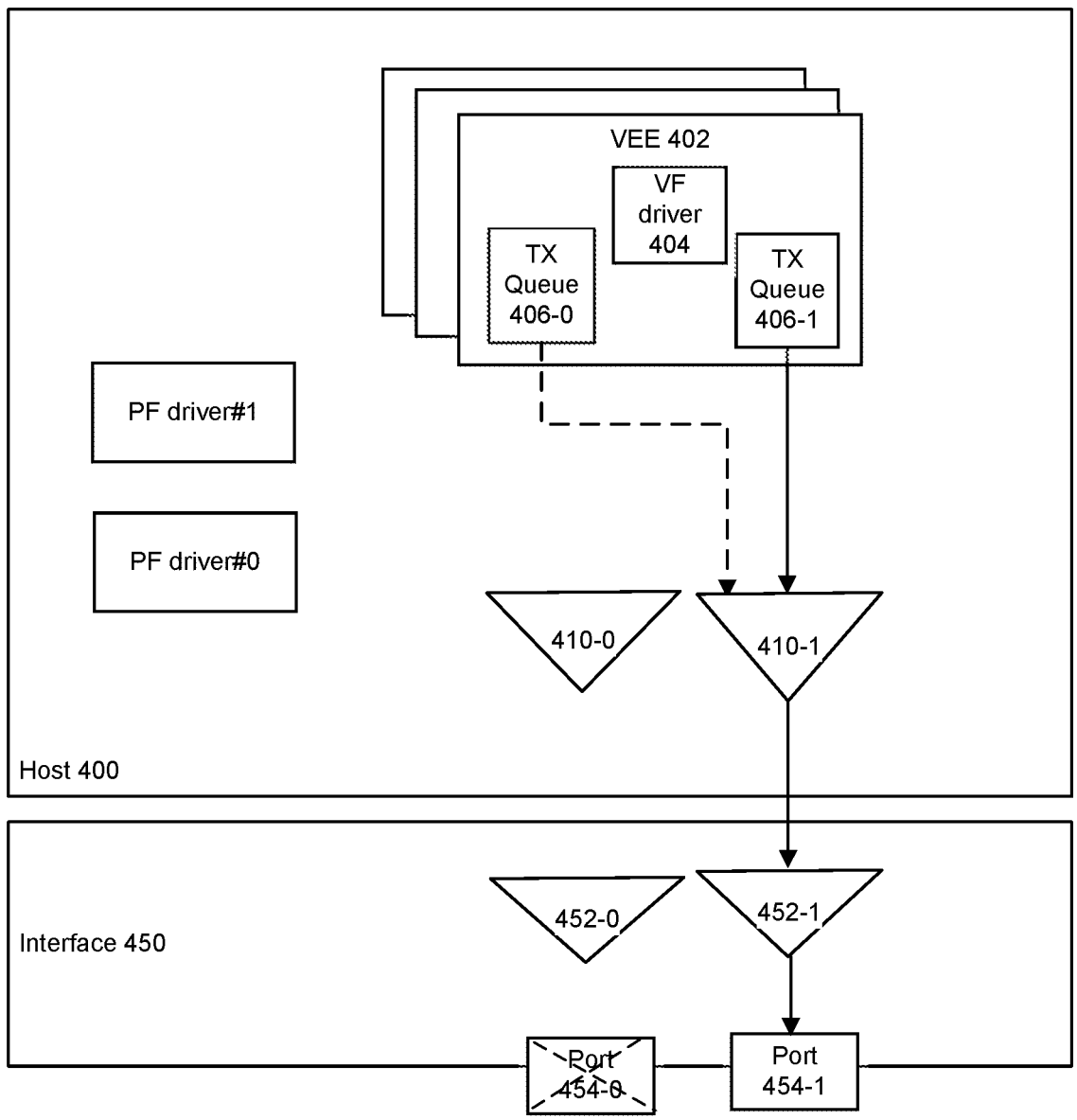
FIG. 4B depicts an example of migration of a queue.

FIG. 4B depicts an example of migration of a TX queue 406-0 from a scheduler 410-0 to a scheduler 410-1 for scheduling using port scheduler 452-1 through port 454-1. TX queue 406-0 was formerly associated with scheduler 410-0 and PF driver #1 associates TX queue 406-0 with scheduler 410-1 for example because of a failure or congestion of port 454-0. Scheduler 410-1 is tied to transmit through port 454-1 through scheduler 452-1 and packets associated with TX queue 406-0 and TX queue 406-1 transmit using port 454-1. In some examples, changing to use of another port (e.g., port 454-1) can occur separate, independent, or without management or request by VEE 402. VEE 402 can continue to request packet transmission from TX queue 406-0 without requesting or requiring use of a particular port.

Figure 4C:
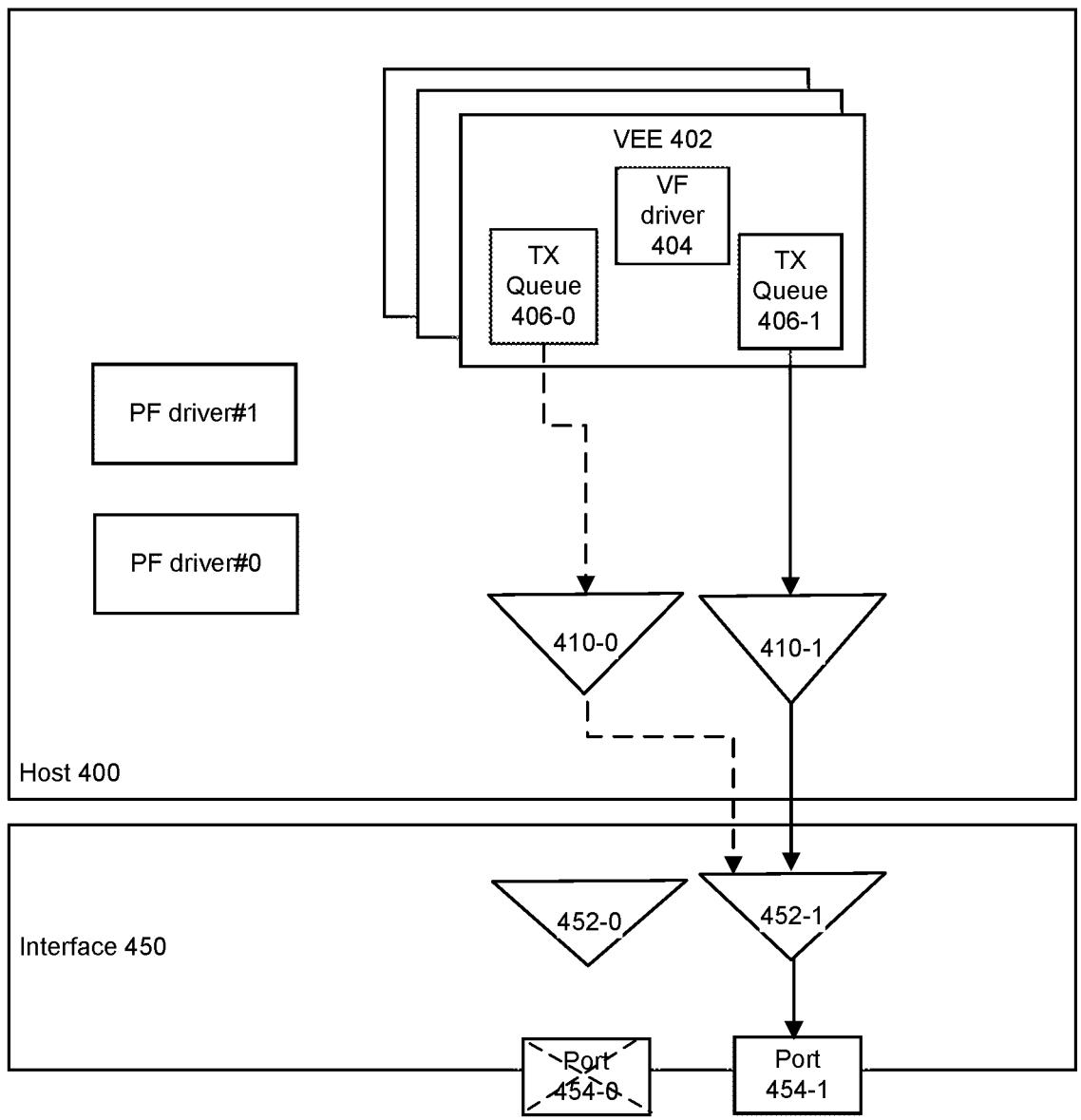
FIG. 4C depicts an example of migration of a host scheduler between ports schedulers.

FIG. 4C depicts an example of migration of a host scheduler 410-0 to port scheduler 452-1. In this example, instead of migrating transmit queue 406-0 to scheduler 410-1, scheduler 410-0 (through which packets associated with transmit queue 406-0 are made available for transmission) is associated with port scheduler 452-1. PF driver #1 can associate scheduler 410-1 with scheduler 452-1. Accordingly, port scheduler 452-1 can schedule packets for transmission from TX queues 406-0 and 406-1 from port 454-1.

Figure 5:
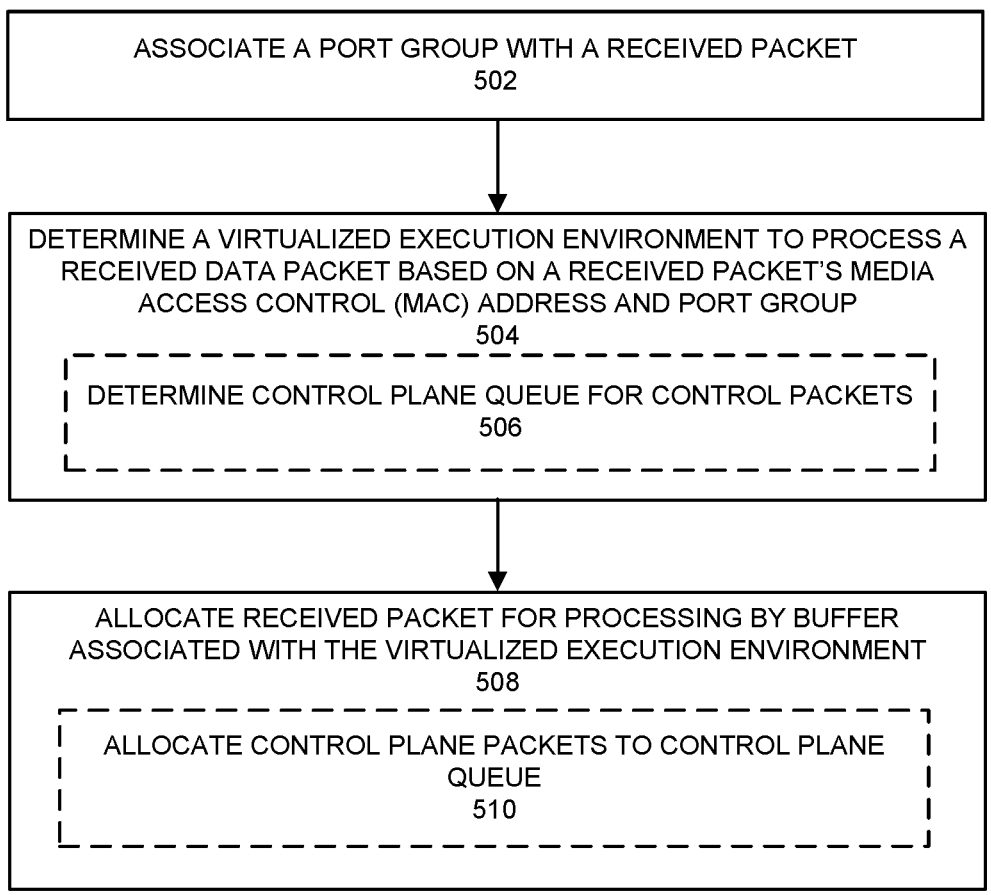
FIG. 5 depicts a process that can be used to determine a receive queue for received packets at an interface.

FIG. 5 depicts a process that can be used to determine a receive queue for received packets at an interface. At 502, a port group can be associated with a received packet. For example, a look-up table of switchIDs can be used to find a port group identifier associated with an ingress port on which a packet was received. In some examples, the port group associated with the port group identifier includes one or more ports and the port group is adjustable to include or remove any port. At 504, a determination can be made of a virtualized execution environment (VEE) to process a received data packet based on a received packet's media access control (MAC) address and port group identifier. For example, a look-up-table can be used to find a VEE associated with a switchID and MAC address. At 506, a determination can be made for a control plane queue for control plane packets. For example, the control plane packets can be allocated to a queue associated with an ingress port.

At 508, the received data packet can be allocated for processing by a receive queue of the determined VEE. For example, a receive packet buffer can receive a copy of the data packet allocated to the VEE using a direct memory access (DMA) copy operation. At 510, a received control plane packet can be copied to a determined control plane queue.

Figure 6:
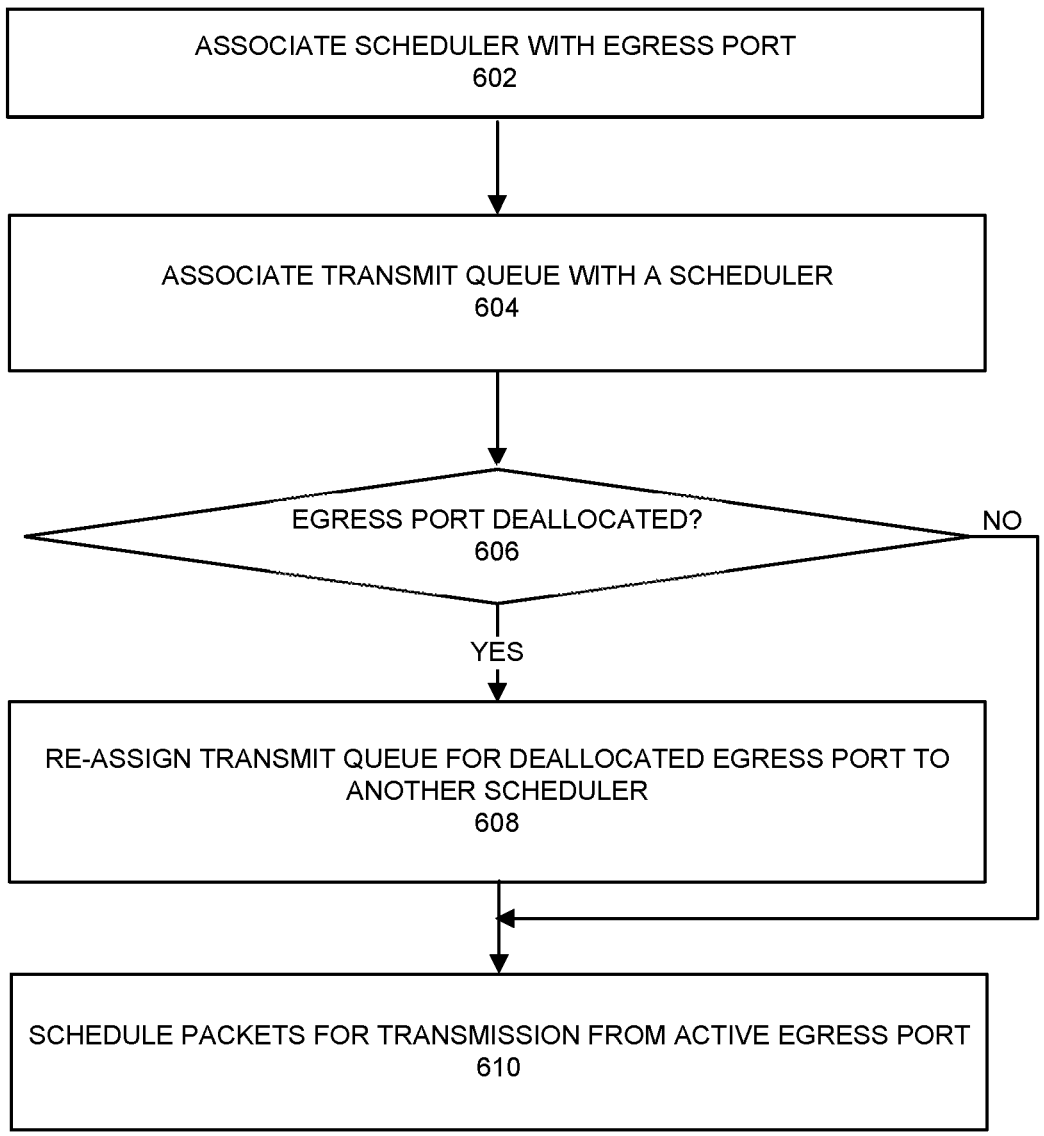
FIG. 6 depicts an example process to allocate a transmit queue to an output port.

FIG. 6 depicts an example process to allocate a transmit queue to an output port. At 602, a scheduler is associated with an egress port. For example, a PF driver can associate the scheduler with a transmit port. At 604, a transmit queue can be associated with a scheduler. For example, a PF driver can associate the transmit queue with a host scheduler. The transmit queue can be used by a virtualized execution environment to store descriptors associated with packets available for transmission. At 606, a determination is made as to whether an egress port is to be deallocated. For example, a transmit port can be deallocated if it fails or is congested. In addition, or alternatively, 606 can include a determination of whether queue should be disassociated from a port scheduler node. If the egress port is to be deallocated or a queue should be disassociated from a port scheduler node, 608 can follow. If the egress port is not to be deallocated or a queue is not to be disassociated from a port scheduler node, 610 can follow.

At 608, any transmit queue associated with a deallocated egress port can be assigned to another scheduler for allocation to another egress port. For example, a PF driver can assign the transmit queue associated with a deallocated egress port to another port scheduler where the another port scheduler is associated with an active egress port. The active egress port can be selected based on having available transmit bandwidth. In some examples, assigning a queue to another port can involve a network interface transmitting packets associated with the queue before the queue is to be migrated but not fetching packets added to the queue while the queue is migrated. In some examples, assigning a queue to another port can involve halting allowing a virtualized execution environment to allocate packets for transmission to the transmit queue until after the allocation to the another transmit port completes. Note that in some examples, re-assigning a transmit queue to another port scheduler can involve associating a host scheduler associated with the transmit queue to another port scheduler.

Action 610 can follow 608. At 610, the port scheduler can scheduler packets for transmission from its active egress port.

Note that in other examples, merely one scheduler layer is used and migration of a transmit queue to another port involves migrating the transmit queue to another scheduler.

Figure 7:
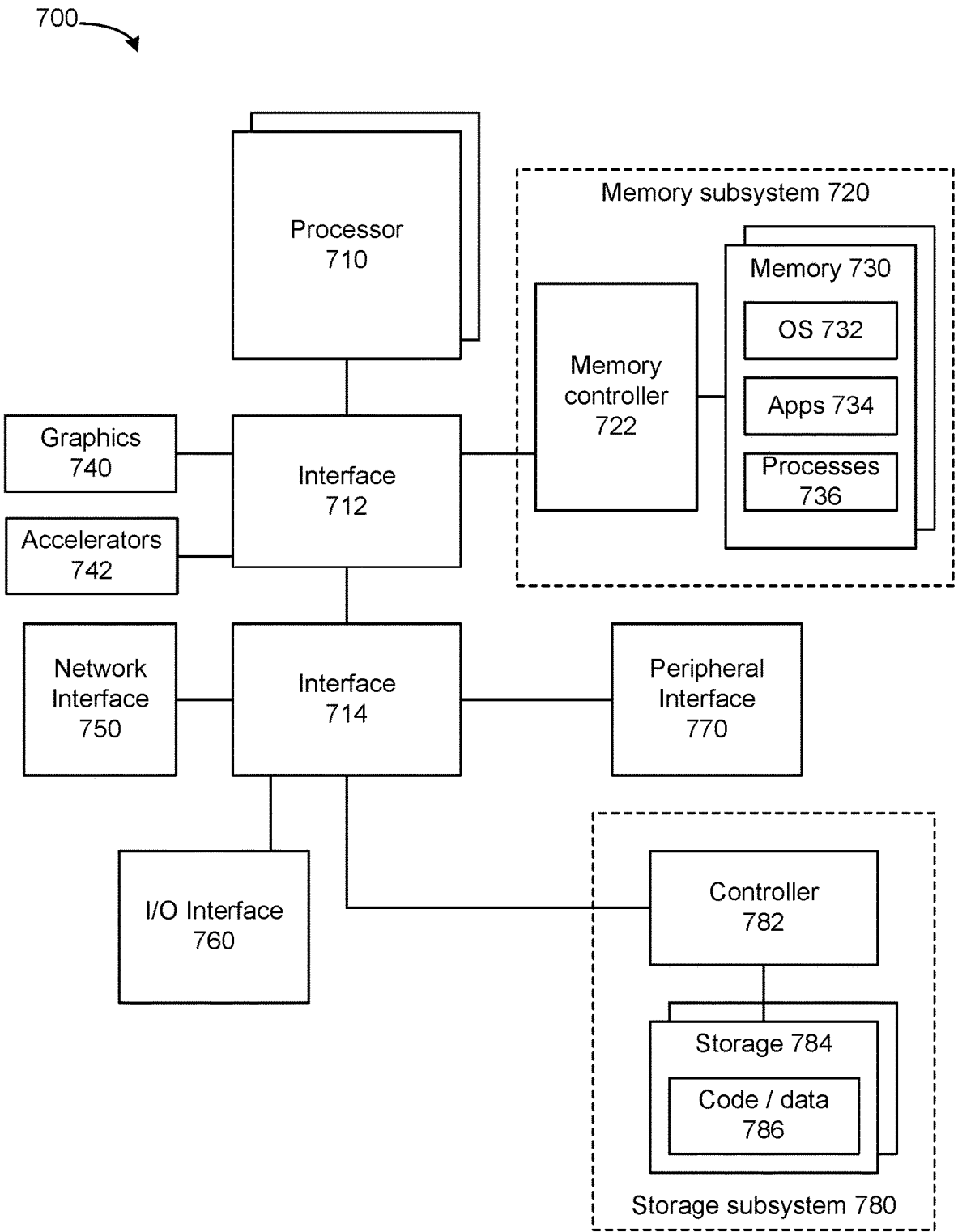
FIG. 7 depicts a system.

FIG. 7 depicts a system. The system can use embodiments described herein to schedule packets for transmission or identify a receive queue for a received packet. System 700 includes processor 710, which provides processing, operation management, and execution of instructions for system 700. Processor 710 can include any type of microprocessor, central processing unit (CPU), graphics processing unit (GPU), processing core, or other processing hardware to provide processing for system 700, or a combination of processors. Processor 710 controls the overall operation of system 700, and can be or include, one or more programmable general-purpose or special-purpose microprocessors, digital signal processors (DSPs), programmable controllers, application specific integrated circuits (ASICs), programmable logic devices (PLDs), or the like, or a combination of such devices.

In one example, system 700 includes interface 712 coupled to processor 710, which can represent a higher speed interface or a high throughput interface for system components that needs higher bandwidth connections, such as memory subsystem 720 or graphics interface components 740, or accelerators 742. Interface 712 represents an interface circuit, which can be a standalone component or integrated onto a processor die. Where present, graphics interface 740 interfaces to graphics components for providing a visual display to a user of system 700. In one example, graphics interface 740 can drive a high definition (HD) display that provides an output to a user. High definition can refer to a display having a pixel density of approximately 100 PPI (pixels per inch) or greater and can include formats such as full HD (e.g., 1080p), retina displays, 4K (ultra-high definition or UHD), or others. In one example, the display can include a touchscreen display. In one example, graphics interface 740 generates a display based on data stored in memory 730 or based on operations executed by processor 710 or both. In one example, graphics interface 740 generates a display based on data stored in memory 730 or based on operations executed by processor 710 or both.

Accelerators 742 can be a fixed function or programmable offload engine that can be accessed or used by a processor 710. For example, an accelerator among accelerators 742 can provide compression (DC) capability, cryptography services such as public key encryption (PKE), cipher, hash/authentication capabilities, decryption, or other capabilities or services. In some embodiments, in addition or alternatively, an accelerator among accelerators 742 provides field select controller capabilities as described herein. In some cases, accelerators 742 can be integrated into a CPU socket (e.g., a connector to a motherboard or circuit board that includes a CPU and provides an electrical interface with the CPU). For example, accelerators 742 can include a single or multi-core processor, graphics processing unit, logical execution unit single or multi-level cache, functional units usable to independently execute programs or threads, application specific integrated circuits (ASICs), neural network processors (NNPs), programmable control logic, and programmable processing elements such as field programmable gate arrays (FPGAs) or programmable logic devices (PLDs). Accelerators 742 can provide multiple neural networks, CPUs, processor cores, general purpose graphics processing units, or graphics processing units can be made available for use by artificial intelligence (AI) or machine learning (ML) models. For example, the AI model can use or include any or a combination of: a reinforcement learning scheme, Q-learning scheme, deep-Q learning, or Asynchronous Advantage Actor-Critic (A3C), combinatorial neural network, recurrent combinatorial neural network, or other AI or ML model. Multiple neural networks, processor cores, or graphics processing units can be made available for use by AI or ML models.

Memory subsystem 720 represents the main memory of system 700 and provides storage for code to be executed by processor 710, or data values to be used in executing a routine. Memory subsystem 720 can include one or more memory devices 730 such as read-only memory (ROM), flash memory, one or more varieties of random access memory (RAM) such as DRAM, or other memory devices, or a combination of such devices. Memory 730 stores and hosts, among other things, operating system (OS) 732 to provide a software platform for execution of instructions in system 700. Additionally, applications 734 can execute on the software platform of OS 732 from memory 730. Applications 734 represent programs that have their own operational logic to perform execution of one or more functions. Processes 736 represent agents or routines that provide auxiliary functions to OS 732 or one or more applications 734 or a combination. OS 732, applications 734, and processes 736 provide software logic to provide functions for system 700. In one example, memory subsystem 720 includes memory controller 722, which is a memory controller to generate and issue commands to memory 730. It will be understood that memory controller 722 could be a physical part of processor 710 or a physical part of interface 712. For example, memory controller 722 can be an integrated memory controller, integrated onto a circuit with processor 710.

While not specifically illustrated, it will be understood that system 700 can include one or more buses or bus systems between devices, such as a memory bus, a graphics bus, interface buses, or others. Buses or other signal lines can communicatively or electrically couple components together, or both communicatively and electrically couple the components. Buses can include physical communication lines, point-to-point connections, bridges, adapters, controllers, or other circuitry or a combination. Buses can include, for example, one or more of a system bus, a Peripheral Component Interconnect (PCI) bus, a Hyper Transport or industry standard architecture (ISA) bus, a small computer system interface (SCSI) bus, a universal serial bus (USB), or an Institute of Electrical and Electronics Engineers (IEEE) standard 1394 bus (Firewire).

In one example, system 700 includes interface 714, which can be coupled to interface 712. In one example, interface 714 represents an interface circuit, which can include stand-alone components and integrated circuitry. In one example, multiple user interface components or peripheral components, or both, couple to interface 714. Network interface 750 provides system 700 the ability to communicate with remote devices (e.g., servers or other computing devices) over one or more networks. Network interface 750 can include an Ethernet adapter, wireless interconnection components, cellular network interconnection components, USB (universal serial bus), or other wired or wireless standards-based or proprietary interfaces. Network interface 750 can transmit data to a device that is in the same data center or rack or a remote device, which can include sending data stored in memory. Network interface 750 can receive data from a remote device, which can include storing received data into memory. Various embodiments can be used in connection with network interface 750, processor 710, and memory subsystem 720. Various embodiments of network interface 750 use embodiments described herein to receive or transmit timing related signals and provide protection against circuit damage from misconfigured port use while providing acceptable propagation delay.

In one example, system 700 includes one or more input/output (I/O) interface(s) 760. I/O interface 760 can include one or more interface components through which a user interacts with system 700 (e.g., audio, alphanumeric, tactile/touch, or other interfacing). Peripheral interface 770 can include any hardware interface not specifically mentioned above. Peripherals refer generally to devices that connect dependently to system 700. A dependent connection is one where system 700 provides the software platform or hardware platform or both on which operation executes, and with which a user interacts.

In one example, system 700 includes storage subsystem 780 to store data in a nonvolatile manner. In one example, in certain system implementations, at least certain components of storage 780 can overlap with components of memory subsystem 720. Storage subsystem 780 includes storage device(s) 784, which can be or include any conventional medium for storing large amounts of data in a nonvolatile manner, such as one or more magnetic, solid state, or optical based disks, or a combination. Storage 784 holds code or instructions and data 786 in a persistent state (i.e., the value is retained despite interruption of power to system 700). Storage 784 can be generically considered to be a "memory," although memory 730 is typically the executing or operating memory to provide instructions to processor 710. Whereas storage 784 is nonvolatile, memory 730 can include volatile memory (i.e., the value or state of the data is indeterminate if power is interrupted to system 700). In one example, storage subsystem 780 includes controller 782 to interface with storage 784. In one example controller 782 is a physical part of interface 714 or processor 710 or can include circuits or logic in both processor 710 and interface 714.

A volatile memory is memory whose state (and therefore the data stored in it) is indeterminate if power is interrupted to the device. Dynamic volatile memory uses refreshing the data stored in the device to maintain state. One example of dynamic volatile memory incudes DRAM (Dynamic Random Access Memory), or some variant such as Synchronous DRAM (SDRAM). A memory subsystem as described herein may be compatible with a number of memory technologies, such as DDR3 (Double Data Rate version 3, original release by JEDEC (Joint Electronic Device Engineering Council) on Jun. 27, 2007). DDR4 (DDR version 4, initial specification published in September 2012 by JEDEC), DDR4E (DDR version 4), LPDDR3 (Low Power DDR version 3, JESD209-3B, August 2013 by JEDEC), LPDDR4) LPDDR version 4, JESD209-4, originally published by JEDEC in August 2014), WIO2 (Wide Input/output version 2, JESD229-2 originally published by JEDEC in August 2014, HBM (High Bandwidth Memory, JESD325, originally published by JEDEC in October 2013, LPDDR5 (currently in discussion by JEDEC), HBM2 (HBM version 2), currently in discussion by JEDEC, or others or combinations of memory technologies, and technologies based on derivatives or extensions of such specifications. The JEDEC standards are available at www.jedec.org.

A non-volatile memory (NVM) device is a memory whose state is determinate even if power is interrupted to the device. In one embodiment, the NVM device can comprise a block addressable memory device, such as NAND technologies, or more specifically, multi-threshold level NAND flash memory (for example, Single-Level Cell ("SLC"), Multi-Level Cell ("MLC"), Quad-Level Cell ("QLC"), Tri-Level Cell ("TLC"), or some other NAND). A NVM device can also comprise a byte-addressable write-in-place three dimensional cross point memory device, or other byte addressable write-in-place NVM device (also referred to as persistent memory), such as single or multi-level Phase Change Memory (PCM) or phase change memory with a switch (PCMS), Intel® Optane™ memory, NVM devices that use chalcogenide phase change material (for example, chalcogenide glass), resistive memory including metal oxide base, oxygen vacancy base and Conductive Bridge Random Access Memory (CB-RAM), nanowire memory, ferroelectric random access memory (FeRAM, FRAM), magneto resistive random access memory (MRAM) that incorporates memristor technology, spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory.

A power source (not depicted) provides power to the components of system 700. More specifically, power source typically interfaces to one or multiple power supplies in system 700 to provide power to the components of system 700. In one example, the power supply includes an AC to DC (alternating current to direct current) adapter to plug into a wall outlet. Such AC power can be renewable energy (e.g., solar power) power source. In one example, power source includes a DC power source, such as an external AC to DC converter. In one example, power source or power supply includes wireless charging hardware to charge via proximity to a charging field. In one example, power source can include an internal battery, alternating current supply, motion-based power supply, solar power supply, or fuel cell source.

In an example, system 700 can be implemented using interconnected compute sleds of processors, memories, storages, network interfaces, and other components. High speed interconnects can be used such as: Ethernet (IEEE 802.3), remote direct memory access (RDMA), InfiniB and, Internet Wide Area RDMA Protocol (iWARP), quick UDP Internet Connections (QUIC), RDMA over Converged Ethernet (RoCE), Peripheral Component Interconnect express (PCIe), Intel QuickPath Interconnect (QPI), Intel Ultra Path Interconnect (UPI), Intel On-Chip System Fabric (IOSF), Omnipath, Compute Express Link (CXL), HyperTransport, high-speed fabric, NVLink, Advanced Microcontroller Bus Architecture (AMBA) interconnect, OpenCAPI, Gen-Z, Cache Coherent Interconnect for Accelerators (CCIX), 3GPP Long Term Evolution (LTE) (4G), 3GPP 5G, and variations thereof. Data can be copied or stored to virtualized storage nodes using a protocol such as NVMe over Fabrics (NVMe-oF) or NVMe.

Figure 8:
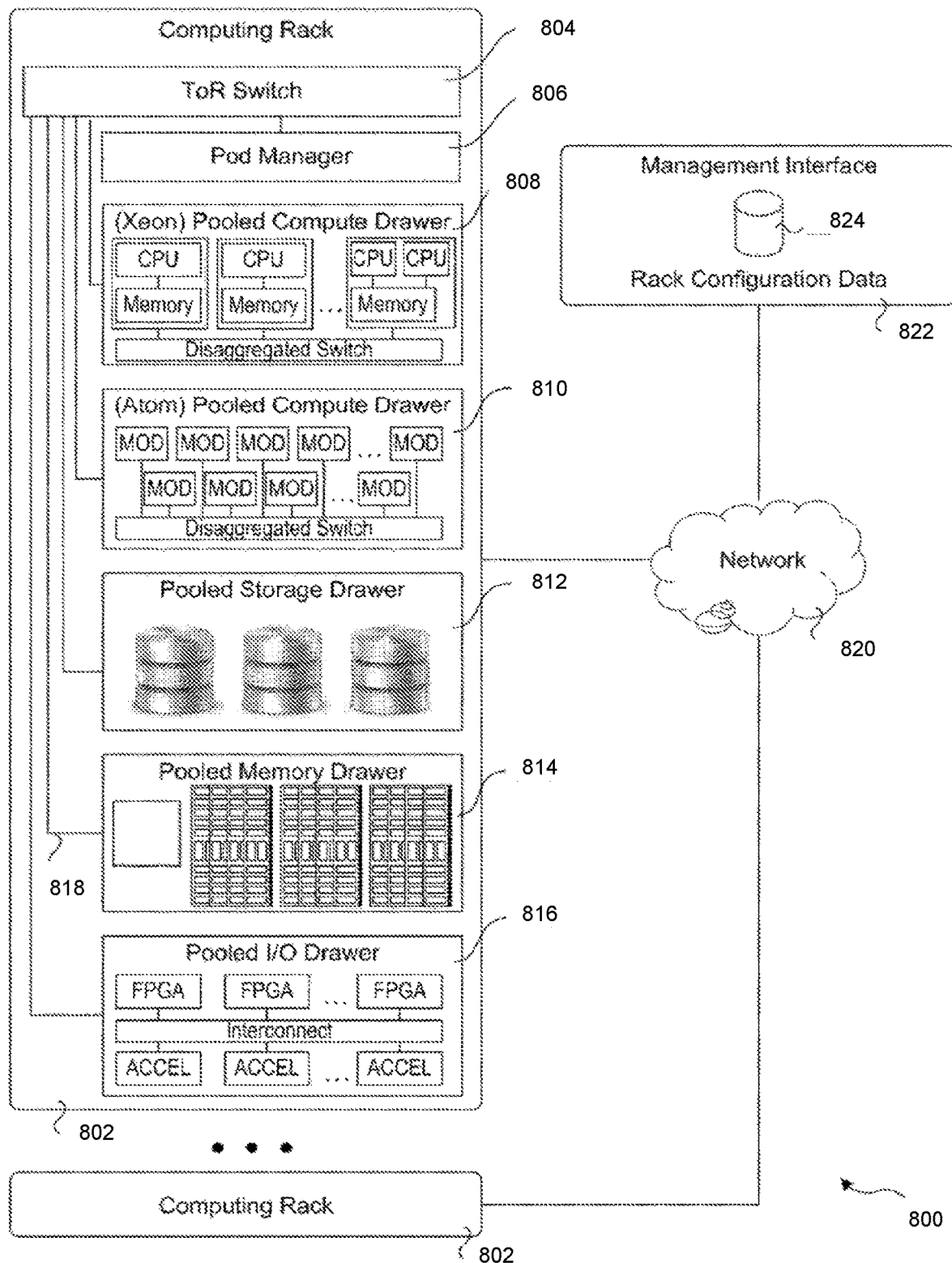
FIG. 8 depicts an environment.

FIG. 8 depicts an environment 800 includes multiple computing racks 802, each including a Top of Rack (ToR) switch 804, a pod manager 806, and a plurality of pooled system drawers. Generally, the pooled system drawers may include pooled compute drawers and pooled storage drawers. Optionally, the pooled system drawers may also include pooled memory drawers and pooled Input/Output (I/O) drawers. In the illustrated embodiment the pooled system drawers include an Intel® Xeon® processor pooled computer drawer 808, and Intel® ATOM™ processor pooled compute drawer 810, a pooled storage drawer 812, a pooled memory drawer 814, and a pooled I/O drawer 816. Each of the pooled system drawers is connected to ToR switch 804 via a high-speed link 818, such as a 40 Gigabit/second (Gb/s) or 100 Gb/s Ethernet link or a 100+ Gb/s Silicon Photonics (SiPh) optical link. In one embodiment high-speed link 818 comprises an 800 Gb/s SiPh optical link.

Multiple of the computing racks 802 may be interconnected via their ToR switches 804 (e.g., to a pod-level switch or data center switch), as illustrated by connections to a network 820. In some embodiments, groups of computing racks 802 are managed as separate pods via pod manager(s) 806. In one embodiment, a single pod manager is used to manage all of the racks in the pod. Alternatively, distributed pod managers may be used for pod management operations.

Environment 800 further includes a management interface 822 that is used to manage various aspects of the environment. This includes managing rack configuration, with corresponding parameters stored as rack configuration data 824.

In an example, environment 800 can be implemented using interconnected compute sleds of processors, memories, storages, network interfaces, and other components.

Figure 9:
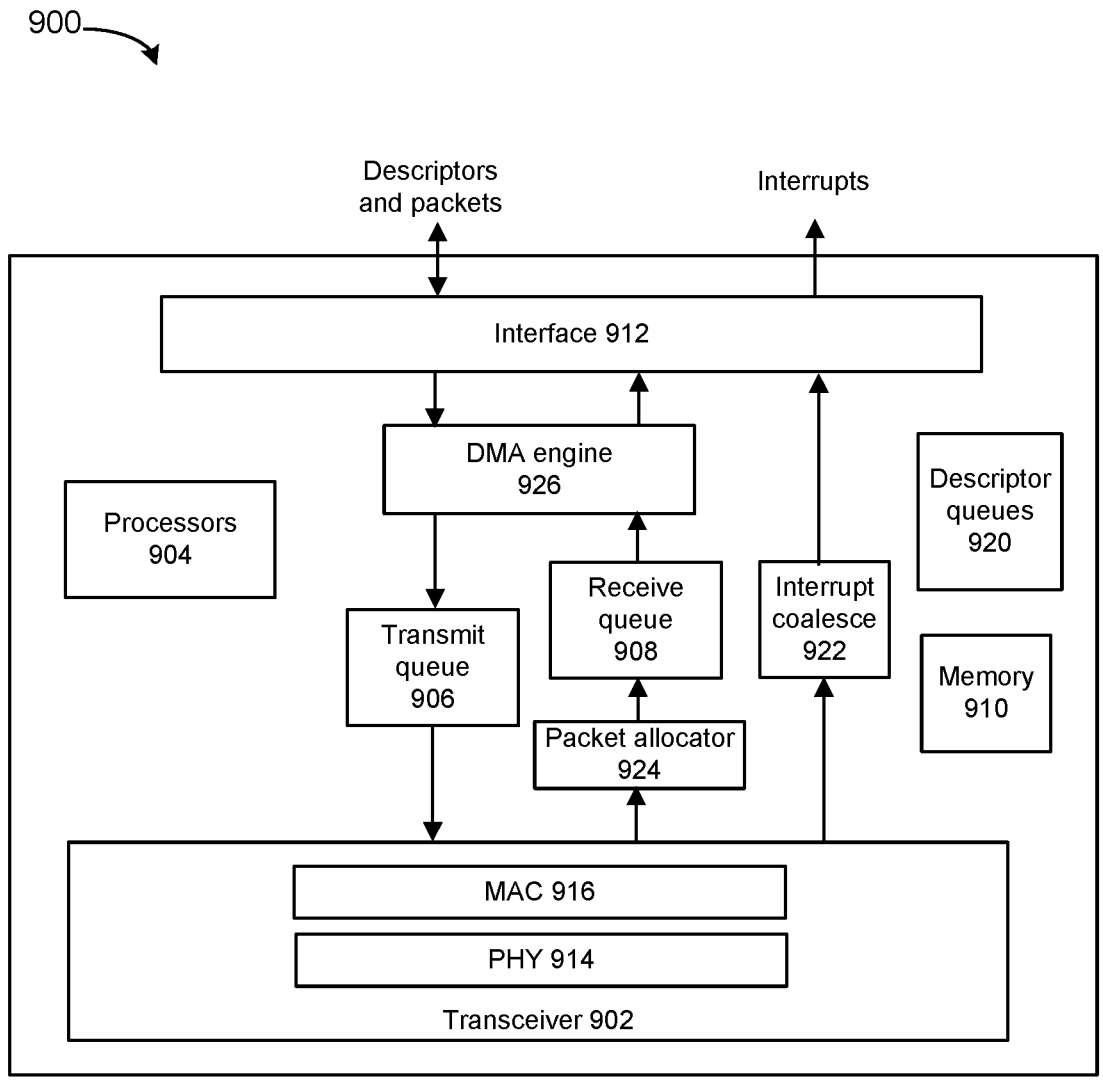
FIG. 9 depicts a network interface.

FIG. 9 depicts a network interface that can use embodiments or be used by embodiments. The network interface can use embodiments described herein in connection with various embodiments for receive queue selection and packet transmit scheduling. Network interface 900 can include transceiver 902, processors 904, transmit queue 906, receive queue 908, memory 910, and bus interface 912, and DMA engine 926. Transceiver 902 can be capable of receiving and transmitting packets in conformance with the applicable protocols such as Ethernet as described in IEEE 802.3, although other protocols may be used. Transceiver 902 can receive and transmit packets from and to a network via a network medium (not depicted). Transceiver 902 can include physical layer (PHY) circuitry 914 and media access control (MAC) circuitry 916. PHY circuitry 914 can include encoding and decoding circuitry (not shown) to encode and decode data packets according to applicable physical layer specifications or standards. MAC circuitry 916 can be configured to assemble data to be transmitted into packets, that include destination and source addresses along with network control information and error detection hash values. MAC circuitry 916 can be configured to process MAC headers of received packets by verifying data integrity, removing preambles and padding, and providing packet content for processing by higher layers.

Processors 904 can be any a combination of a: processor, core, graphics processing unit (GPU), field programmable gate array (FPGA), application specific integrated circuit (ASIC), or other programmable hardware device that allow programming of network interface 900. For example, processors 904 can provide for allocation or deallocation of intermediate queues. For example, a "smart network interface" can provide packet processing capabilities in the network interface using processors 904.

Packet allocator 924 can provide distribution of received packets for processing by multiple CPUs or cores using timeslot allocation described herein or RSS. When packet allocator 924 uses RSS, packet allocator 924 can calculate a hash or make another determination based on contents of a received packet to determine which CPU or core is to process a packet.

Interrupt coalesce 922 can perform interrupt moderation whereby network interface interrupt coalesce 922 waits for multiple packets to arrive, or for a time-out to expire, before generating an interrupt to host system to process received packet(s). Receive Segment Coalescing (RSC) can be performed by network interface 900 whereby portions of incoming packets are combined into segments of a packet. Network interface 900 provides this coalesced packet to an application.

Direct memory access (DMA) engine 926 can copy a packet header, packet payload, and/or descriptor directly from host memory to the network interface or vice versa, instead of copying the packet to an intermediate buffer at the host and then using another copy operation from the intermediate buffer to the destination buffer.

Memory 910 can be any type of volatile or non-volatile memory device and can store any queue or instructions used to program network interface 900. Transmit queue 906 can include data or references to data for transmission by network interface. Receive queue 908 can include data or references to data that was received by network interface from a network. Descriptor queues 920 can include descriptors that reference data or packets in transmit queue 906 or receive queue 908. Bus interface 912 can provide an interface with host device (not depicted). For example, bus interface 912 can be compatible with peripheral connect Peripheral Component Interconnect (PCI), PCI Express, PCI-x, Serial ATA (SATA), and/or Universal Serial Bus (USB) compatible interface (although other interconnection standards may be used).

Figure 10:
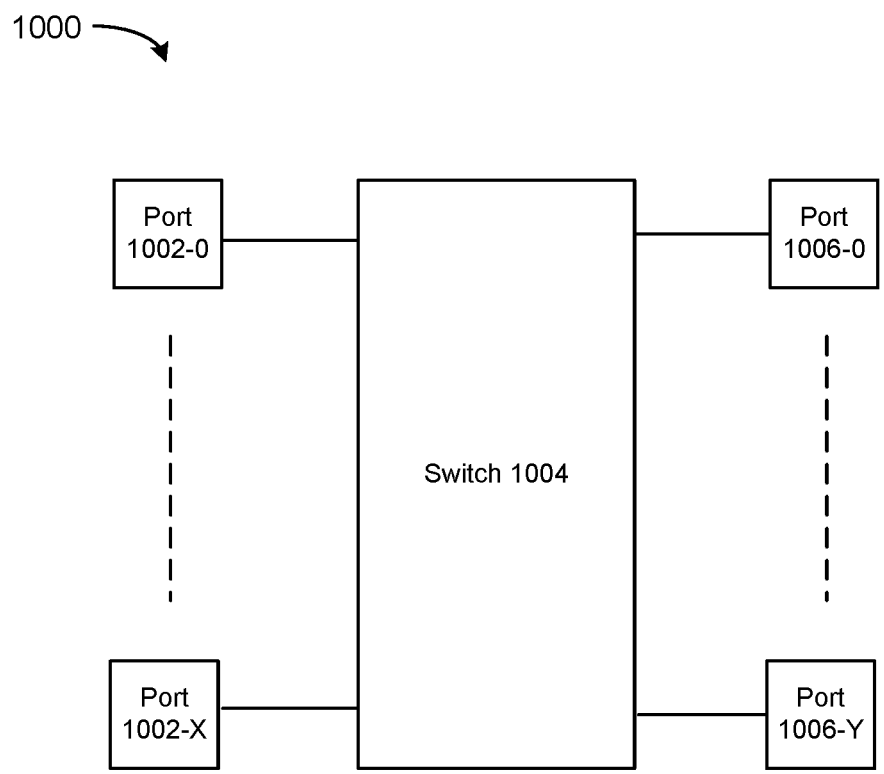
FIG. 10 depicts an example switch.

FIG. 10 depicts an example switch. Various embodiments can be used in or with the switch of FIG. 10 to provide receive queues or packet transmit scheduling. Switch 1004 can route packets or frames of any format or in accordance with any specification from any port 1002-0 to 1002-X to any of ports 1006-0 to 1006-Y (or vice versa). Any of ports 1002-0 to 1002-X can be connected to a network of one or more interconnected devices. Similarly, any of ports 1006-0 to 1006-X can be connected to a network of one or more interconnected devices. Switch 1004 can decide which port to transfer packets or frames to using a table that maps packet characteristics with an associated output port. For example, match-action tables can be used whereby a hash of a portion of a packet is used as an index to find an entry. In addition, switch 1004 can perform packet replication for forwarding of a packet or frame to multiple ports and queuing of packets or frames prior to transfer to an output port. Some embodiments implement hash-lookup in P4 programming language, which is a programming language designed to allow programming of packet forwarding in data-planes. In contrast to general purpose language such as C or python, P4 is domain-specific language with a number of constructs optimized around network data forwarding.

Embodiments herein may be implemented in various types of computing and networking equipment, such as switches, routers, racks, and blade servers such as those employed in a data center and/or server farm environment. The servers used in data centers and server farms comprise arrayed server configurations such as rack-based servers or blade servers. These servers are interconnected in communication via various network provisions, such as partitioning sets of servers into Local Area Networks (LANs) with appropriate switching and routing facilities between the LANs to form a private Intranet, part of the Internet, public cloud, private cloud, or hybrid cloud. For example, cloud hosting facilities may typically employ large data centers with a multitude of servers. A blade comprises a separate computing platform that is configured to perform server-type functions, that is, a "server on a card." Accordingly, each blade includes components common to conventional servers, including a main printed circuit board (main board) providing internal wiring (i.e., buses) for coupling appropriate integrated circuits (ICs) and other components mounted to the board.

In some examples, network interface and other embodiments described herein can be used in connection with a base station (e.g., 3G, 4G, 5G and so forth), macro base station (e.g., 5G networks), picostation (e.g., an IEEE 802.11 compatible access point), nanostation (e.g., for Point-to-MultiPoint (PtMP) applications), on-premises data centers, off-premises data centers, edge network elements, fog network elements, and/or hybrid data centers (e.g., data center that use virtualization, cloud and software-defined networking to deliver application workloads across physical data centers and distributed multi-cloud environments).

Various examples may be implemented using hardware elements, software elements, or a combination of both. In some examples, hardware elements may include devices, components, processors, microprocessors, circuits, circuit elements (e.g., transistors, resistors, capacitors, inductors, and so forth), integrated circuits, ASICs, PLDs, DSPs, FPGAs, memory units, logic gates, registers, semiconductor device, chips, microchips, chip sets, and so forth. In some examples, software elements may include software components, programs, applications, computer programs, application programs, system programs, machine programs, operating system software, middleware, firmware, software modules, routines, subroutines, functions, methods, procedures, software interfaces, APIs, instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation. A processor can be one or more combination of a hardware state machine, digital control logic, central processing unit, or any hardware, firmware and/or software elements.

Some examples may be implemented using or as an article of manufacture or at least one computer-readable medium. A computer-readable medium may include a non-transitory storage medium to store logic. In some examples, the non-transitory storage medium may include one or more types of computer-readable storage media capable of storing electronic data, including volatile memory or non-volatile memory, removable or non-removable memory, erasable or non-erasable memory, writeable or re-writeable memory, and so forth. In some examples, the logic may include various software elements, such as software components, programs, applications, computer programs, application programs, system programs, machine programs, operating system software, middleware, firmware, software modules, routines, subroutines, functions, methods, procedures, software interfaces, API, instruction sets, computing code, computer code, code segments, computer code segments, words, values, symbols, or any combination thereof.

According to some examples, a computer-readable medium may include a non-transitory storage medium to store or maintain instructions that when executed by a machine, computing device or system, cause the machine, computing device or system to perform methods and/or operations in accordance with the described examples. The instructions may include any suitable type of code, such as source code, compiled code, interpreted code, executable code, static code, dynamic code, and the like. The instructions may be implemented according to a predefined computer language, manner or syntax, for instructing a machine, computing device or system to perform a certain function. The instructions may be implemented using any suitable high-level, low-level, object-oriented, visual, compiled and/or interpreted programming language.

One or more aspects of at least one example may be implemented by representative instructions stored on at least one machine-readable medium which represents various logic within the processor, which when read by a machine, computing device or system causes the machine, computing device or system to fabricate logic to perform the techniques described herein. Such representations, known as "IP cores" may be stored on a tangible, machine readable medium and supplied to various customers or manufacturing facilities to load into the fabrication machines that actually make the logic or processor.

The appearances of the phrase "one example" or "an example" are not necessarily all referring to the same example or embodiment. Any aspect described herein can be combined with any other aspect or similar aspect described herein, regardless of whether the aspects are described with respect to the same figure or element. Division, omission or inclusion of block functions depicted in the accompanying figures does not infer that the hardware components, circuits, software and/or elements for implementing these functions would necessarily be divided, omitted, or included in embodiments.

Some examples may be described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

The terms "first," "second," and the like, herein do not denote any order, quantity, or importance, but rather are used to distinguish one element from another. The terms "a" and "an" herein do not denote a limitation of quantity, but rather denote the presence of at least one of the referenced items. The term "asserted" used herein with reference to a signal denote a state of the signal, in which the signal is active, and which can be achieved by applying any logic level either logic 0 or logic 1 to the signal. The terms "follow" or "after" can refer to immediately following or following after some other event or events. Other sequences of operations may also be performed according to alternative embodiments. Furthermore, additional operations may be added or removed depending on the particular applications. Any combination of changes can be used and one of ordinary skill in the art with the benefit of this disclosure would understand the many variations, modifications, and alternative embodiments thereof.

Disjunctive language such as the phrase "at least one of X, Y, or Z," unless specifically stated otherwise, is otherwise understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present. Additionally, conjunctive language such as the phrase "at least one of X, Y, and Z," unless specifically stated otherwise, should also be understood to mean X, Y, Z, or any combination thereof, including "X, Y, and/or Z.'"

Illustrative examples of the devices, systems, and methods disclosed herein are provided below. An embodiment of the devices, systems, and methods may include any one or more, and any combination of, the examples described below.

Some examples include: a method of receiving a packet from a port on a network interface; determining a receive queue for the packet based at least on a port group associated with the packet, wherein the port group is associated with one or more ports; and copying the packet to the determined receive queue. Any method can include: adjusting the port group to add a second port; receiving a second packet at the second port on the network interface; determining that the second packet is associated with the port group; and copying the second packet to the receive queue. Any method can include: receiving a control packet from a first port; associating the first port with a physical function driver; and copying the control packet to a control packet receive queue associated with the physical function driver. Any method can include: identifying the first port as receiving the control packet in a descriptor; receiving a second control packet on a second port; identifying the second port as receiving the second control packet in a second descriptor; and copying the second control packet to the control packet receive queue.

Some examples include at least one non-transitory computer-readable medium, comprising instructions stored thereon, that if executed by at least one processor, cause the at least one processor to: allocate a transmit queue to a first scheduler; allocate the first scheduler to a first port; and in response to identification of the first port as not available, allocate the first scheduler to a second port. In some examples, the instructions comprise part of a physical function driver. In some examples, selection of the second port is based on the second port having spare transmit bandwidth. In some examples, a virtualized execution environment is to allocate a packet to the transmit queue. In some examples, identification of the first port as not available comprises the first port has failed or is congested. In some examples, allocation the first scheduler to a second port occurs independent from a virtual machine managing the allocation.

Some examples include a system comprising: a network interface; at least one memory; and at least one processor communicatively coupled to the network interface and the at least one memory, the at least one processor to: modify an egress port associated with a transmit queue independent of a virtualized execution environment that provides packets to the transmit queue and assign a received packet to a destination queue based at least in part on a port group identifier, wherein the port group identifier is associated with one or more ports. In some examples, modify the egress port, the at least one processor is to assign a scheduler associated with the transmit queue to another egress port. In some examples, at least one processor is to execute a driver to allocate the scheduler to another egress port.

Example 1 includes an apparatus comprising: at least one processor to: execute a physical function (PF) driver to change an egress port used by a virtualized execution environment to transmit packets toward another egress port; and permit the virtualized execution environment to request packet transmissions during change of egress port toward the another egress port.

Example 2 includes any example, wherein to change the egress port, the PF driver is to associate transmit packets with the another egress port.

Example 3 includes any example, wherein to change the egress port, the PF driver is to based on unavailability of the egress port, allocate a transmit packet scheduler to the another egress port to cause one or more packets allocated to a transmit queue associated with the transmit packet scheduler to be transmitted using the another egress port.

Example 4 includes any example, wherein any transmit packet associated with the transmit queue before the change to the another egress port is permitted to transmit but a packet added to the transmit queue during the change to the another egress port is not permitted to transmit until completion of the change to the another egress port.

Example 5 includes any example, wherein the unavailability of the egress port comprises the egress port has failed or is congested.

Example 6 includes any example, and includes based on unavailability of the egress port, drop one or more control packets to be sent through the egress port.

Example 7 includes any example, wherein said processor is to execute a virtualized execution environment that is to allocate at least one packet to a transmit queue and wherein during change of egress port to the another egress port to cause one or more packet allocated to the transmit queue to be transmitted using the another egress port is to occur independent from port change by the virtualized execution environment.

Example 8 includes any example, wherein the PF driver is to allocate transmit packets to a scheduler that is allocated to the another egress port.

Example 9 includes any example, and includes one or more of: a network interface, rack, compute sled, host computer, or data center.

Example 10 includes any example, and includes a method comprising: changing an egress port used by a virtualized execution environment to transmit packets toward another egress port independent of the virtualized execution environment requesting to change to use the another egress port, wherein a physical function (PF) driver changes the egress port toward the another egress port.

Example 11 includes any example, wherein changing an egress port comprises associating one or more packets to be transmitted with the another egress port.

Example 12 includes any example, wherein changing an egress port comprises associating a transmit packet scheduler toward the another egress port and comprising: transmitting one or more packet allocated to a transmit queue associated with the transmit packet scheduler using the another egress port.

Example 13 includes any example, wherein changing an egress port used by a virtualized execution environment to transmit packets toward the another egress port is based on unavailability of the egress port.

Example 14 includes any example, wherein the unavailability of the egress port comprises the egress port has failed or is congested.

Example 15 includes any example, and includes: based on unavailability of the egress port, dropping one or more control packets to be sent through the egress port.

Example 16 includes any example, and includes at least one non-transitory computer-readable medium, comprising instructions stored thereon, that if executed by at least one processor, cause the at least one processor to: execute a physical function (PF) driver that is to change from an egress port to transmit one or more packets for a virtualized execution environment toward another egress port to transmit one or more packets independent of the virtualized execution environment requesting to change to use another egress port to transmit packets.

Example 17 includes any example, and includes instructions stored thereon, that if executed by at least one processor, cause the at least one processor to: select the another egress port based on the another egress port having spare transmit bandwidth.

Example 18 includes any example, wherein the PF driver is to change from the egress port to the another egress port based on the egress port having failed or being congested.

Example 19 includes any example, wherein the change from an egress port to the another egress port occurs while the virtualized execution environment continues to request packet transmission.

Example 20 includes any example, and includes instructions stored thereon, that if executed by at least one processor, cause the at least one processor to: allocate a transmit packet scheduler to the another egress port to cause one or more packet allocated to a transmit queue associated with the transmit packet scheduler to be transmitted using the another egress port.

What is claimed is:

1. An apparatus comprising:
an interface and
at least one processor coupled to the interface, the at least one processor to:
 execute a physical function (PF) driver to change an egress port used by a virtualized execution environment to transmit packets to a second egress port; and
 permit the virtualized execution environment to request packet transmissions during change from the egress port to a second egress port, wherein
  to transmit packets through the egress port, the virtualized execution environment is to provide the packets to a packet transmit queue and
  to change from the egress port to the second egress port, the PF driver is to allocate the packet transmit queue to a transmit packet scheduler associated with the second egress port.

2. The apparatus of claim 1, wherein the PF driver is to change the egress port used by the virtualized execution environment to transmit packets to the second egress port based on unavailability of the egress port.

3. The apparatus of claim 1, wherein at least one packet associated with the packet transmit queue before the change to the second egress port is permitted to transmit but a packet added to the packet transmit queue during the change to the second egress port is not permitted to transmit until completion of the change to the second egress port.

4. The apparatus of claim 2, wherein the unavailability of the egress port comprises the egress port has failed or is congested.

5. The apparatus of claim 2, wherein the at least one processor is to:
 based on unavailability of the egress port, drop one or more control packets to be sent through the egress port.

6. The apparatus of claim 1, wherein the at least one processor is to execute the virtualized execution environment that is to allocate at least one packet to the transmit queue and wherein during change of egress port to the second egress port to cause the one or more packets allocated to the transmit queue to be transmitted using the second egress port is to occur independent from port change.

7. The apparatus of claim 1, comprising one or more of: a network interface, rack, compute sled, host computer, or data center, wherein the network interface, rack, compute sled, host computer, or data center comprises the at least one processor.

8. The apparatus of claim 1, wherein to change packet transmission by the virtualized execution environment from the second egress port to the egress port, the PF driver is to allocate the packet transmit queue to a second transmit scheduler associated with the egress port.

9. The apparatus of claim 1, wherein to change packet transmission by the virtualized execution environment from the second egress port to the egress port, the PF driver is to allocate the transmit packet scheduler to a port scheduler associated with the egress port.

10. A method comprising:
changing an egress port used by a virtualized execution environment to transmit packets through a second egress port independent of the virtualized execution environment requesting to change to use the second egress port by a physical function (PF) driver associating a transmit queue associated with the virtualized execution environment with a packet transmit scheduler associated with the second egress port.

11. The method of claim 10, wherein changing the egress port comprises:
transmitting one or more packet allocated to the transmit queue associated with the transmit packet scheduler using the second egress port.

12. The method of claim 10, wherein changing the egress port used by a virtualized execution environment to transmit packets through the second egress port is based on unavailability of the egress port.

13. The method of claim 12, wherein the unavailability of the egress port comprises the egress port has failed or is congested.

14. The method of claim 10, comprising:
based on unavailability of the egress port, dropping one or more control packets to be sent through the egress port.

15. At least one non-transitory computer-readable medium, comprising instructions stored thereon, that if executed by at least one processor, cause the at least one processor to:
execute a physical function (PF) driver that is to change from an egress port to transmit one or more packets for a virtualized execution environment to a second egress port independent of the virtualized execution environment requesting to change to use the second egress port to transmit the one or more packets by the PF driver associating a transmit queue associated with the virtualized execution environment with a packet transmit scheduler associated with the second egress port.

16. The at least one computer-readable medium of claim 15, comprising instructions stored thereon, that if executed by the at least one processor, cause the at least one processor to:

select the second egress port based on the second egress port having spare transmit bandwidth.

17. The at least one computer-readable medium of claim 15, wherein the PF driver is to change from the egress port to the second egress port based on the egress port having failed or being congested.

18. The at least one computer-readable medium of claim 15, wherein the change from the egress port to the second egress port occurs while the virtualized execution environment continues to request packet transmission.

\* \* \* \* \*